United States Patent
Chiyo et al.

(10) Patent No.: US 9,558,882 B2
(45) Date of Patent: Jan. 31, 2017

(54) POWER FEEDING COIL UNIT AND WIRELESS POWER TRANSMISSION DEVICE

(71) Applicant: TDK CORPORATION, Tokyo (JP)

(72) Inventors: Noritaka Chiyo, Tokyo (JP); Takeshi Kamono, Tokyo (JP); Narutoshi Fukuzawa, Tokyo (JP); Toshinori Matsuura, Tokyo (JP); Tetsuya Nishiyama, Tokyo (JP)

(73) Assignee: TDK CORPORATION, Tokyo (JP)

( * ) Notice: Subject to any disclaimer, the term of this patent is extended or adjusted under 35 U.S.C. 154(b) by 87 days.

(21) Appl. No.: 14/548,420

(22) Filed: Nov. 20, 2014

(65) Prior Publication Data

US 2015/0145339 A1    May 28, 2015

(30) Foreign Application Priority Data

Nov. 28, 2013   (JP) .................. 2013-246444

(51) Int. Cl.
*H01F 5/00* (2006.01)
*H01F 27/34* (2006.01)
(Continued)

(52) U.S. Cl.
CPC ............. *H01F 27/346* (2013.01); *B60L 11/00* (2013.01); *H01F 5/00* (2013.01); *H01F 27/24* (2013.01); *H01F 27/28* (2013.01); *H01F 27/38* (2013.01); *H01F 27/42* (2013.01); *H01F 37/00* (2013.01); *H01F 38/00* (2013.01); *H01F 38/14* (2013.01); *H02J 5/005* (2013.01); *H02J 7/0042* (2013.01); *H02J 7/025* (2013.01); *H02J 17/00* (2013.01)

(58) Field of Classification Search
CPC . H01F 5/00; H01F 27/00–27/35; H01F 27/42; H01F 37/00; H01F 38/00
USPC .. 336/170–173, 200, 232, 220–223; 307/104
See application file for complete search history.

(56) References Cited

U.S. PATENT DOCUMENTS

| 4,873,677 A | 10/1989 | Sakamoto et al. | |
| 8,422,973 B2 * | 4/2013 | Takarada | H01Q 7/00 340/572.1 |

(Continued)

FOREIGN PATENT DOCUMENTS

| JP | S64-23730 A | 1/1989 |
| JP | H06-225482 A | 8/1994 |

(Continued)

OTHER PUBLICATIONS

May 19, 2015 Extended Search Report issued in European Patent Application No. 14194982.6.

(Continued)

*Primary Examiner* — Tuyen Nguyen
(74) *Attorney, Agent, or Firm* — Oliff PLC

(57) ABSTRACT

A power feeding coil unit includes a power feeding coil, and an auxiliary coil. The auxiliary coil is arranged not to interlink with a magnetic flux that interlinks with a power receiving coil that is arranged to face the power feeding coil during power feeding. An axial direction of the auxiliary coil is nonparallel to an opposing direction of the power feeding coil and the power receiving coil. A direction of circulation of a magnetic flux generated by the auxiliary coil is opposite to a direction of circulation of a magnetic flux generated by the power feeding coil.

9 Claims, 17 Drawing Sheets

(51) Int. Cl.
*H01F 27/28* (2006.01)
*H01F 38/14* (2006.01)
*H02J 5/00* (2016.01)
*H01F 27/24* (2006.01)
*H01F 27/42* (2006.01)
*H01F 38/00* (2006.01)
*H01F 37/00* (2006.01)
*B60L 11/00* (2006.01)
*H01F 27/38* (2006.01)
*H02J 7/02* (2016.01)
*H02J 7/00* (2006.01)
*H02J 17/00* (2006.01)

(56) References Cited

U.S. PATENT DOCUMENTS

| | | |
|---|---|---|
| 8,508,184 B2 | 8/2013 | Sakakibara et al. |
| 9,318,258 B2 * | 4/2016 | Yamakawa .............. H01F 38/14 |
| 2002/0079863 A1 | 6/2002 | Abe et al. |
| 2012/0074899 A1 | 3/2012 | Tsai et al. |
| 2012/0119698 A1 * | 5/2012 | Karalis ................. B60L 11/182 320/108 |
| 2013/0093252 A1 * | 4/2013 | Norconk ................ H02J 5/005 307/104 |
| 2014/0084697 A1 | 3/2014 | Yasuda et al. |

FOREIGN PATENT DOCUMENTS

| | | |
|---|---|---|
| JP | H07-231586 A | 8/1995 |
| JP | H08-223094 A | 8/1996 |
| JP | H09-65502 A | 3/1997 |
| JP | H09-74034 A | 3/1997 |
| JP | H09-283346 A | 10/1997 |
| JP | 2002-199598 A | 7/2002 |
| JP | 2010-172084 A | 8/2010 |
| JP | 2011-234496 A | 11/2011 |
| JP | 2012-151311 A | 8/2012 |
| JP | 2013-039027 A | 2/2013 |
| JP | 5253607 B1 | 7/2013 |
| JP | 2013-207727 A | 10/2013 |
| WO | 2013/172336 A1 | 11/2013 |
| WO | 2014/119296 A1 | 8/2014 |

OTHER PUBLICATIONS

Jun. 1, 2015 Extended Search Report issued in European Patent Application No. 14194935.4.
Jul. 5, 2016 Office Action Issued in U.S. Appl. No. 14/549,118.
Jul. 28, 2016 Office Action Issued in U.S. Appl. No. 14/548,950.
Jul. 18, 2016 Office Action issued in Chinese Application No. 201410714380.5.
May 30, 2016 Office Action issued in Chinese Application No. 201410707722.0.

* cited by examiner

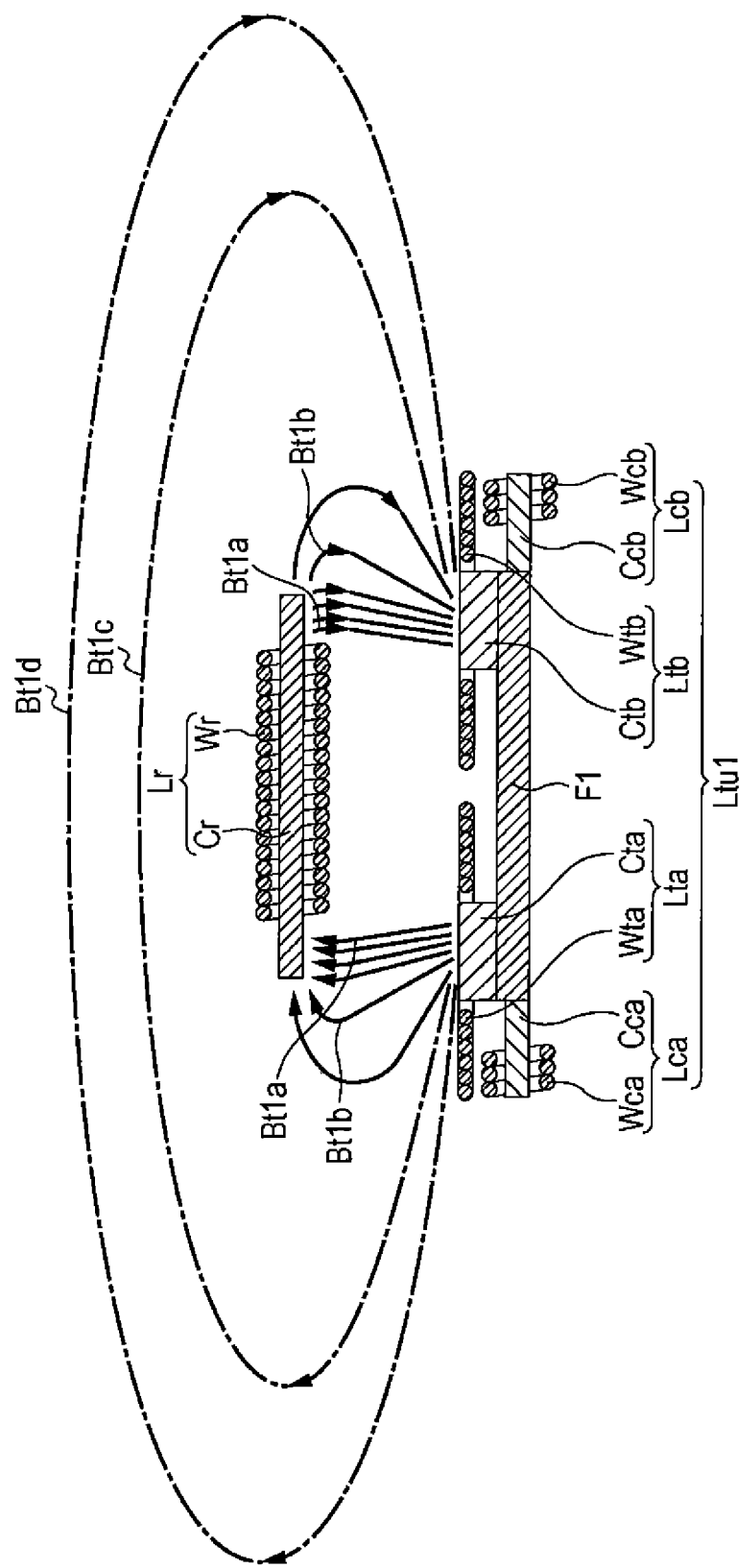

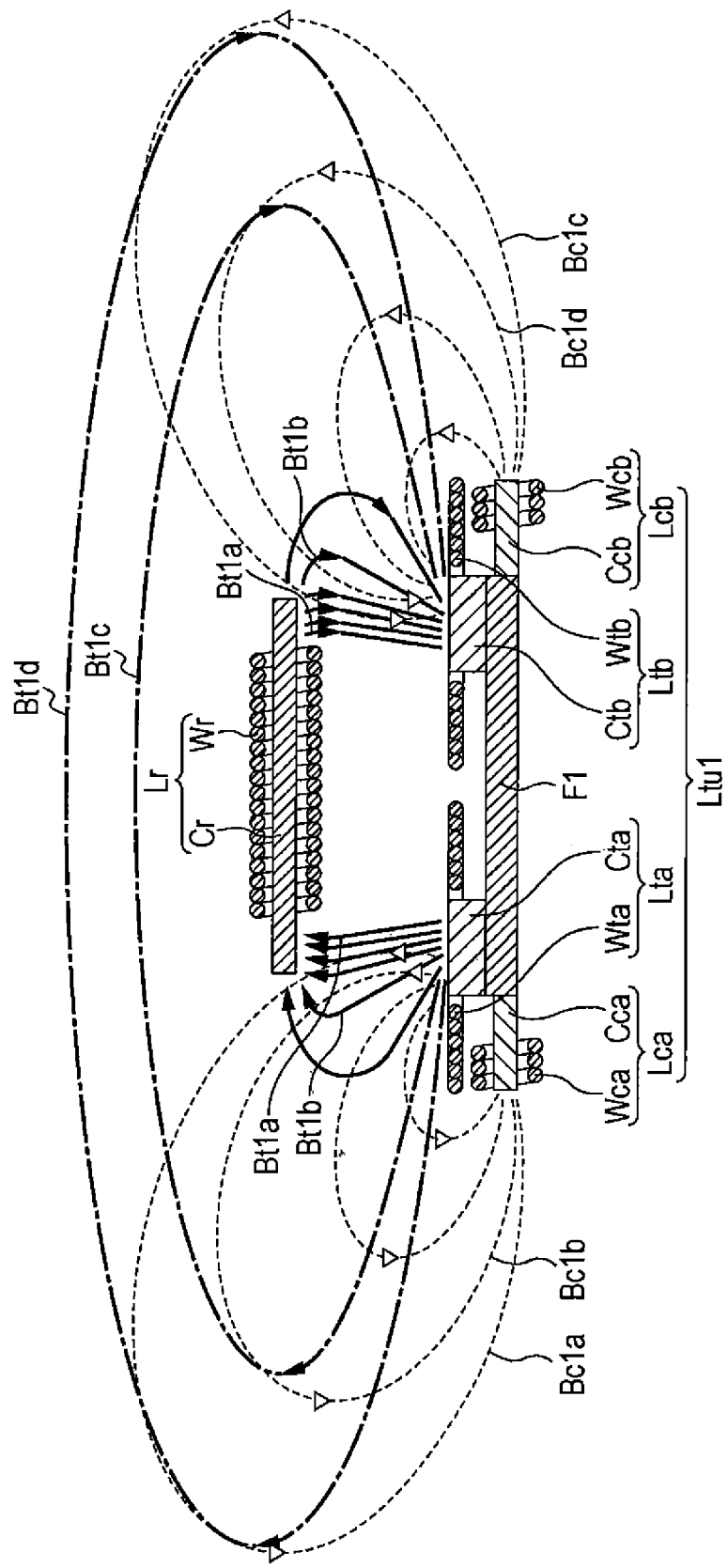

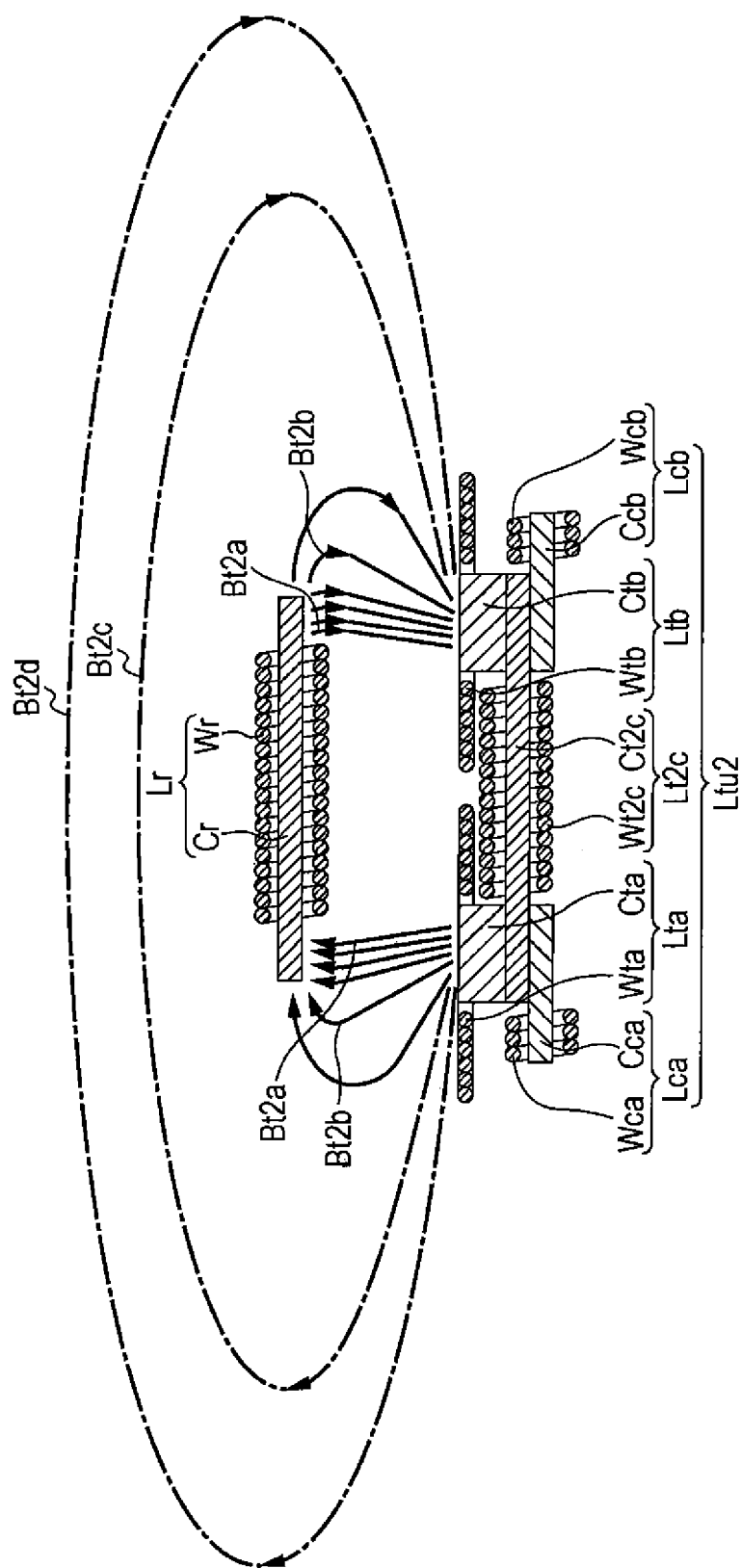

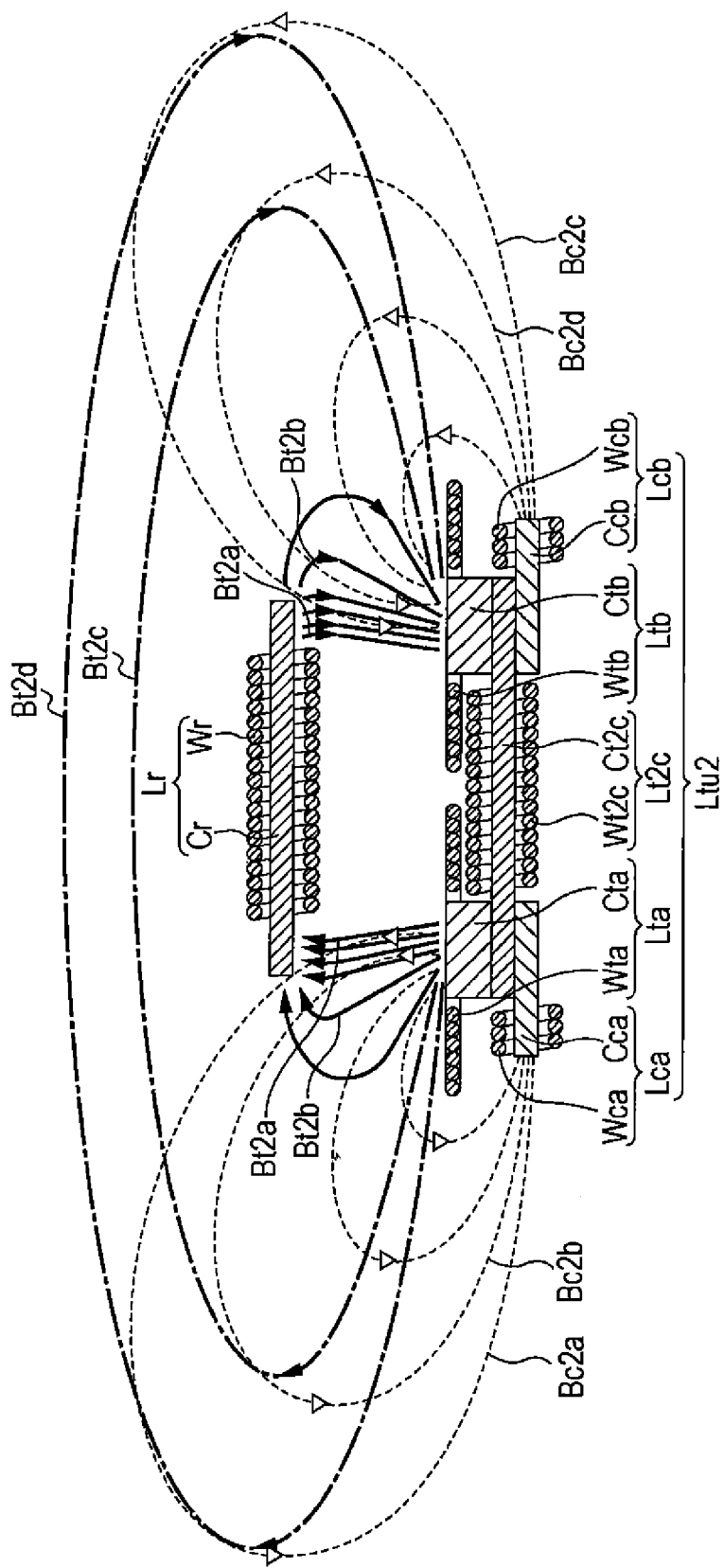

FIG. 8
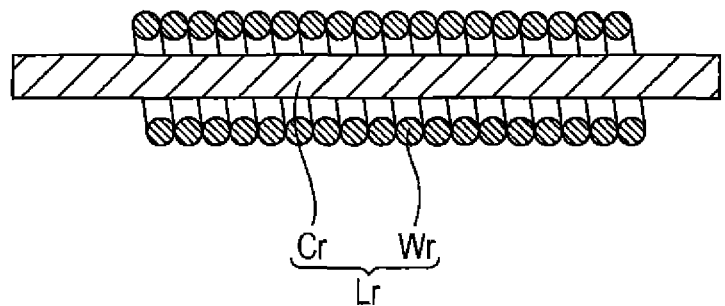
Cr Wr
Lr
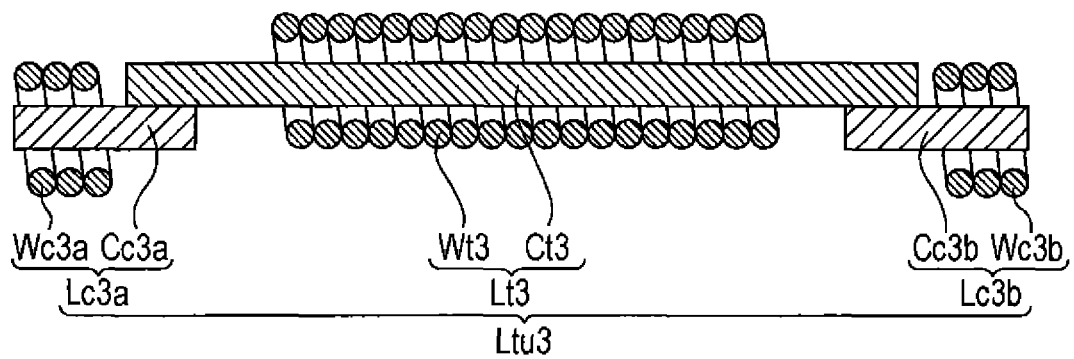
Wc3a Cc3a   Wt3 Ct3   Cc3b Wc3b
Lc3a        Lt3       Lc3b
            Ltu3

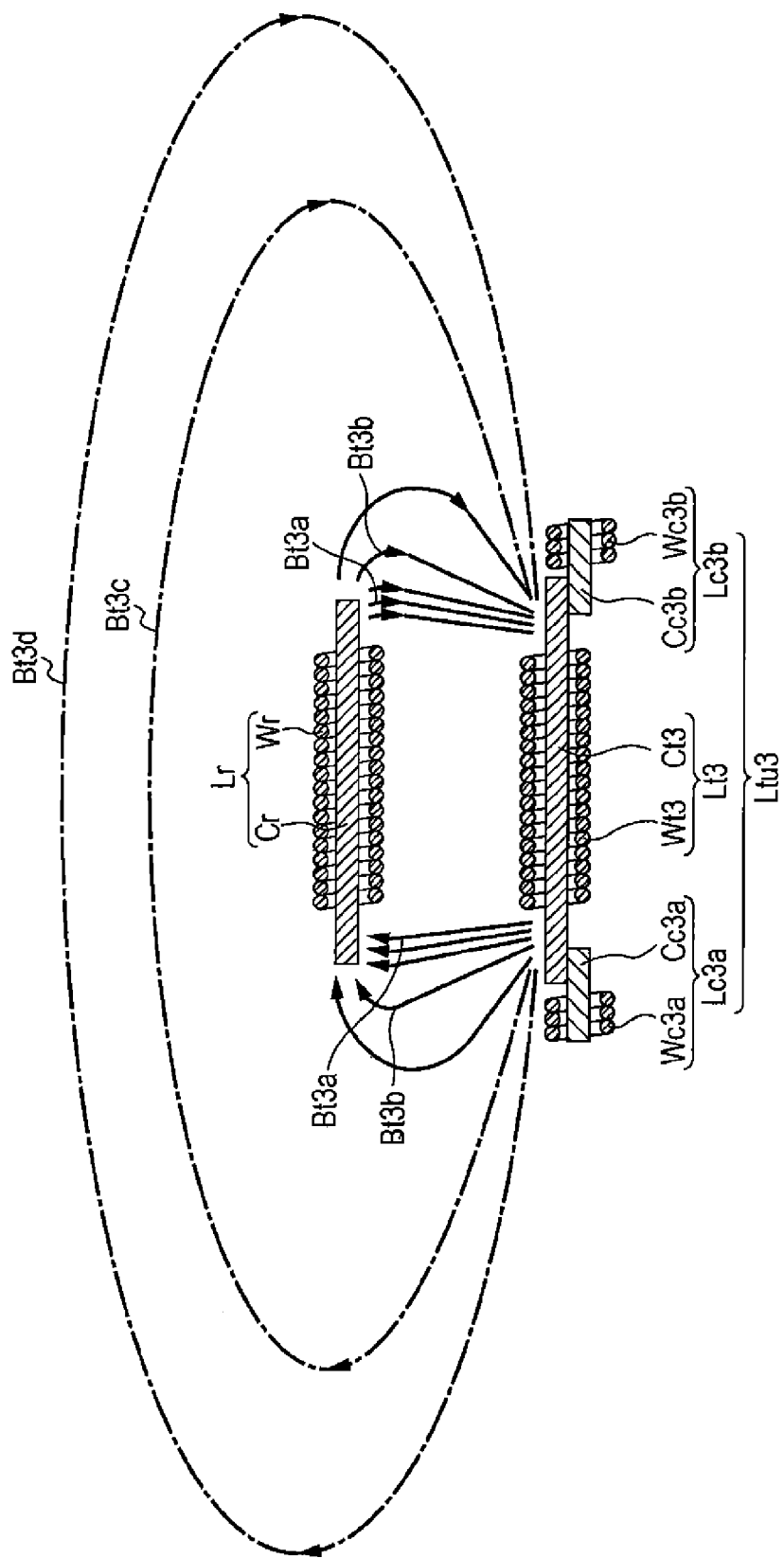

FIG. 12
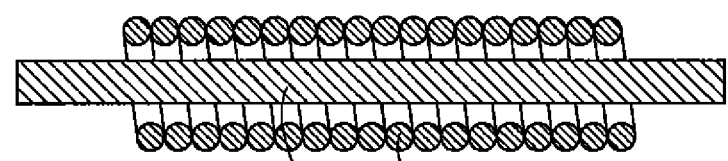
Cr10  Wr10
Lr10
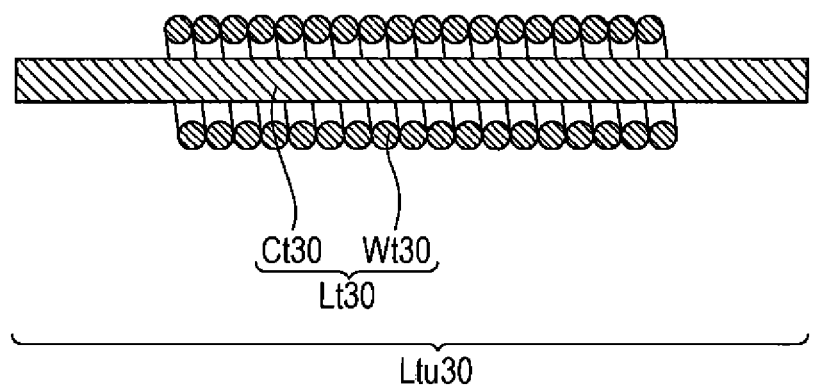
Ct30  Wt30
Lt30
Ltu30

POWER FEEDING COIL UNIT AND WIRELESS POWER TRANSMISSION DEVICE

BACKGROUND OF THE INVENTION

1. Field of the Invention

The present invention relates to a power feeding coil unit and a wireless power transmission device for wireless transmission of power.

2. Description of the Related Art

Wireless power transmission technology that utilizes an electromagnetic induction effect between a primary (power feeding) coil and a secondary (power receiving) coil that face each other to transmit power without any mechanical contact such as a cable has attracted attention recently. There has been an increasing demand for the development of a technology that allows high-efficiency and low-loss power transmission.

In this situation, the issue of an unwanted leakage magnetic field formed around the power feeding coil due to the leakage magnetic flux of the power feeding coil has been gaining attention. For example, in the application of wireless power transmission technology to chargers for power electronic devices such as electric vehicles, due to the demand for high-power transmission, a large current needs to flow through the power feeding coil. In this case, the strength of the unwanted leakage magnetic field due to the leakage magnetic flux also increases, raising a concern of potentially inducing electromagnetic interference which might affect nearby electronic equipment and so forth.

To address the issue described above, for example, Japanese Unexamined Patent Application Publication No. 09-74034 discloses a technique for eliminating or reducing noise caused by the leakage magnetic flux of a coil for power transmission by using a noise canceling coil that interlinks with the magnetic flux created by the coil for power transmission.

However, in the technique disclosed in Japanese Unexamined Patent Application Publication No. 09-74034, since the magnetic flux created by the coil for power transmission interlinks with the noise canceling coil, even a magnetic flux that would contribute to power transmission might also be canceled, resulting in a reduction in power transmission efficiency.

SUMMARY OF THE INVENTION

Accordingly, an embodiment of the present invention provides a power feeding coil unit and a wireless power transmission device to prevent or minimize a reduction in power transmission efficiency while reducing an unwanted leakage magnetic field formed in a location away from a power feeding coil.

A power feeding coil unit according to an aspect of the present invention is a power feeding coil unit for wirelessly feeding power. The power feeding coil unit includes a power feeding coil and an auxiliary coil. The auxiliary coil is arranged not to interlink with a magnetic flux interlinking with a power receiving coil that is arranged to face a power feeding coil during power feeding. An axial direction of the auxiliary coil is nonparallel to an opposing direction of the power feeding coil and the power receiving coil. A direction of circulation of a magnetic flux generated by the auxiliary coil is opposite to a direction of circulation of a magnetic flux generated by the power feeding coil.

According to the aspect of the present invention, the axial direction of the auxiliary coil is nonparallel to the opposing direction of the power feeding coil and the power receiving coil. Thus, the magnetic flux generated by the auxiliary coil easily circulates also in a location away from the auxiliary coil without interlinking with the power receiving coil. In this state, the direction of circulation of the magnetic flux generated by the auxiliary coil is opposite to the direction of circulation of the magnetic flux generated by the power feeding coil. In locations away from the power feeding coil and the auxiliary coil, which are magnetic flux generators, therefore, the magnetic flux generated by the power feeding coil and the magnetic flux generated by the auxiliary coil are oriented in opposite directions, allowing the magnetic flux generated by the power feeding coil and the magnetic flux generated by the auxiliary coil to be canceled by each other. The strength of a magnetic field formed in a location away from the power feeding coil is reduced. In addition, the auxiliary coil is arranged not to interlink with a magnetic flux interlinking with the power receiving coil arranged to face the power feeding coil during power feeding. Thus, a magnetic flux contributing to power transmission is not canceled out using the auxiliary coil. Accordingly, a reduction in power transmission efficiency may be prevented or minimized with a reduction in an unwanted leakage magnetic field formed in a location away from a power feeding coil.

The power feeding coil unit according to the aspect of the present invention may be configured such that the magnetic flux generated by the auxiliary coil does not cancel a magnetic flux that is generated by the power feeding coil and is interlinking with the power receiving coil, and the magnetic flux generated by the auxiliary coil cancels some amount of magnetic flux that is generated by the power feeding coil and is not interlinking with the power receiving coil. Here, a large proportion of a magnetic flux that forms an unwanted leakage magnetic field in a location away from the power feeding coil is a magnetic flux not interlinking with the power receiving coil. In the aspect of the present invention, the magnetic flux generated by the auxiliary coil does not cancel the magnetic flux that is generated by the power feeding coil and is interlinking with the power receiving coil, and the magnetic flux generated by the auxiliary coil cancels some amount of magnetic flux that is generated by the power feeding coil and is not interlinking with the power receiving coil. Accordingly, a reduction in power transmission efficiency may be prevented or minimized with a reduction in an unwanted leakage magnetic field formed in a location away from a power feeding coil. The phrase "not cancel the magnetic flux interlinking with the power receiving coil", as used herein, is not intended to exclude even accidental cancellation of a magnetic flux interlinking with the power receiving coil by the magnetic flux generated by the auxiliary coil in a location away from the power feeding coil when part of the magnetic flux interlinking with the power receiving coil circulates also in a location away from the power feeding coil due to some influence of the ambient environment or the like.

In addition, the power feeding coil unit according to the aspect of the present invention may be configured such that a magnetic field generated by the auxiliary coil enhances a part of a magnetic field between the power feeding coil and the power receiving coil. In this case, the magnetic flux generated by the power feeding coil and the magnetic flux generated by the auxiliary coil are oriented in substantially the same direction between the power feeding coil and the power receiving coil. Accordingly, a magnetic flux interlinking both the power feeding coil and the power receiving coil, which contributes to power transmission, is not canceled by the magnetic flux generated by the auxiliary coil. As a result, a reduction in power transmission efficiency may be prevented or minimized.

Preferably, each of the power feeding coil and the auxiliary coil includes a magnetic core, and the magnetic core of the auxiliary coil is coupled to the magnetic core of the power feeding coil. In this case, the auxiliary coil easily generates a magnetic flux that enhances a magnetic field between the power feeding coil and the power receiving coil. That is, the magnetic flux generated by the power feeding coil and the magnetic flux generated by the auxiliary coil are oriented in substantially the same direction between the power feeding coil and the power receiving coil. Accordingly, a magnetic flux interlinking both the power feeding coil and the power receiving coil, which contributes to power transmission, is not canceled by the magnetic flux generated by the auxiliary coil. As a result, a reduction in power transmission efficiency may further be prevented or minimized.

Preferably, the auxiliary coil is located on the opposite to a side of the power feeding coil facing the power receiving coil. In this case, the auxiliary coil easily generates a magnetic flux that enhances a magnetic field between the power feeding coil and the power receiving coil. That is, the magnetic flux generated by the power feeding coil and the magnetic flux generated by the auxiliary coil are oriented in substantially the same direction between the power feeding coil and the power receiving coil. Accordingly, a magnetic flux interlinking both the power feeding coil and the power receiving coil, which contributes to power transmission, is not canceled by the magnetic flux generated by the auxiliary coil. As a result, a reduction in power transmission efficiency may further be prevented or minimized.

More preferably, the auxiliary coil is arranged so that part or all of the auxiliary coil overlaps the power feeding coil when viewed from the opposing direction of the power feeding coil and the power receiving coil. In this case, the auxiliary coil and the power feeding coil are arranged so as to be closer to each other. Thus, the density distribution of the magnetic flux generated by the auxiliary coil in a location away from the power feeding coil may be made closer to the density distribution of the magnetic flux generated by the power feeding coil. As a result, the effect of reducing an unwanted leakage magnetic field formed in a location away from the power feeding coil may further be enhanced.

Preferably, the axial direction of the auxiliary coil is substantially perpendicular to the opposing direction of the power feeding coil and the power receiving coil. In this case, the auxiliary coil easily generates a magnetic flux that circulates also in a location away from the auxiliary coil. Accordingly, the effect of reducing an unwanted leakage magnetic field formed in a location away from the power feeding coil may further be enhanced.

In addition, the power feeding coil unit according to the aspect of the present invention may be configured such that the power feeding coil includes a first power feeding coil and a second power feeding coil that are apposed, and a magnetic path interlinking the first power feeding coil and the second power feeding coil is generated by a magnetic field of the first power feeding coil and a magnetic field of the second power feeding coil. In this case, the first and second power feeding coils efficiently generate a magnetic flux interlinking with the power receiving coil, and thus power transmission efficiency may be improved.

Preferably, at least part of the magnetic flux generated by the auxiliary coil interlinks with the power feeding coil. In this case, the auxiliary coil easily generates a magnetic flux that enhances a magnetic field between the power feeding coil and the power receiving coil. That is, the magnetic flux generated by the power feeding coil and the magnetic flux generated by the auxiliary coil are oriented in substantially the same direction between the power feeding coil and the power receiving coil. Accordingly, a magnetic flux interlinking both the power feeding coil and the power receiving coil, which contributes to power transmission, is not canceled by the magnetic flux generated by the auxiliary coil. As a result, a reduction in power transmission efficiency may further be prevented or minimized.

Preferably, the power feeding coil unit further includes an additional coil arranged on the opposite to a side of the power feeding coil facing the power receiving coil and arranged so as to have a center portion located between a center portion of the first power feeding coil and a center portion of the second power feeding coil. Preferably, a magnetic path interlinking the first power feeding coil, the second power feeding coil, and the additional coil is generated by a magnetic field of the first power feeding coil, a magnetic field of the second power feeding coil, and a magnetic field of the additional coil. In this case, the density of the magnetic flux generated by the power feeding coil may further be increased. Accordingly, a magnetic flux contributing to power transmission is more efficiently generated, and power transmission efficiency may thus be further increased.

Preferably, the auxiliary coil includes a first auxiliary coil and a second auxiliary coil, and the first auxiliary coil and the second auxiliary coil are arranged so that a center portion of the power feeding coil is located between a center portion of the first auxiliary coil and a center portion of the second auxiliary coil. In this case, since two auxiliary coils are arranged on both outer sides of the power feeding coil, an unwanted leakage magnetic field formed in a location away from the power feeding coil may further be reduced.

A wireless power transmission device according to another aspect of the present invention includes the power feeding coil unit described above, and a power receiving coil. According to the aspect of the present invention, it may be possible to provide a wireless power transmission device that prevents or minimizes a reduction in power transmission efficiency while reducing an unwanted leakage magnetic field formed in a location away from a power feeding coil.

According to some aspects of the present invention, therefore, it may be possible to provide a power feeding coil unit and a wireless power transmission device that prevent or minimize a reduction in power transmission efficiency while reducing an unwanted leakage magnetic field formed in a location away from a power feeding coil.

BRIEF DESCRIPTION OF THE DRAWINGS

FIG. 3A is a diagram schematically illustrating the magnetic flux generated by first and second power feeding coils in FIG. 2.

FIG. 3B is a diagram schematically illustrating the magnetic flux generated by the first and second power feeding coils and first and second auxiliary coils in FIG. 2.

FIG. 6A is a diagram schematically illustrating the magnetic flux generated by first and second power feeding coils and an additional coil in FIG. 5.

FIG. 6B is a diagram schematically illustrating the magnetic flux generated by the first and second power feeding coils, the additional coil, and first and second auxiliary coils in FIG. 5.

FIG. 8 is a cross-sectional view illustrating a power feeding coil unit according to the third embodiment of the present invention together with a power receiving coil.

FIG. 9A is a diagram schematically illustrating the magnetic flux generated by a power feeding coil in FIG. 8.

FIG. 12 is a cross-sectional view illustrating a power feeding coil unit in Comparative Example 3 together with a power receiving coil.

DESCRIPTION OF THE PREFERRED EMBODIMENTS

Embodiments of the present invention will be described in detail with reference to the drawings. In the following description, substantially the same elements or elements having substantially the same function are given the same numerals or signs, and are not described again.

First Embodiment

Figure 1:
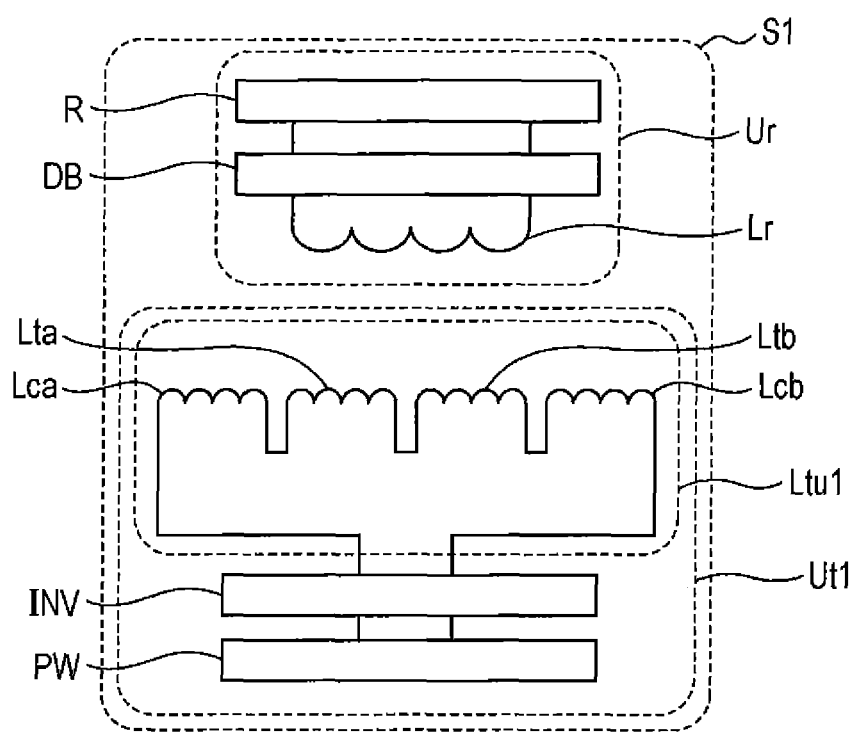
FIG. 1 is a system configuration diagram illustrating a wireless power transmission device according to a first embodiment of the present invention together with a load.
Figure 2:
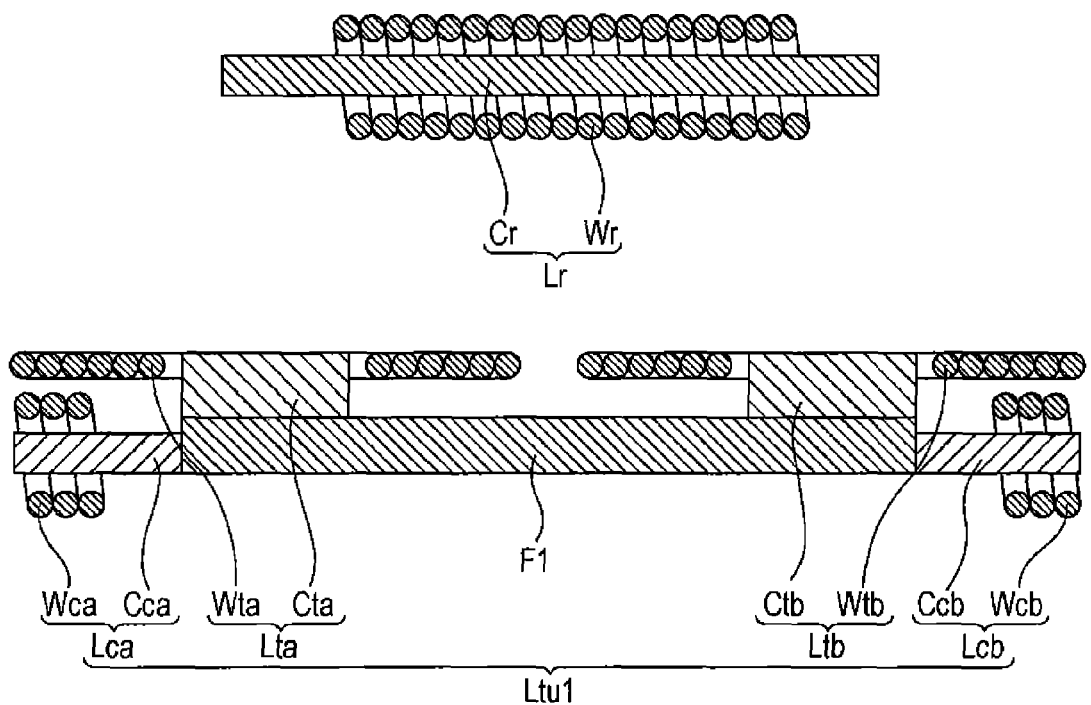
FIG. 2 is a cross-sectional view illustrating a power feeding coil unit according to the first embodiment of the present invention together with a power receiving coil.

First, a configuration of a wireless power transmission device S1 according to a first embodiment of the present invention will be described with reference to FIG. 1 and FIG. 2. FIG. 1 is a system configuration diagram illustrating a wireless power transmission device according to the first embodiment of the present invention together with a load. FIG. 2 is a cross-sectional view illustrating a power feeding coil unit according to the first embodiment of the present invention together with a power receiving coil.

As illustrated in FIG. 1, the wireless power transmission device S1 includes a wireless power feeding device Ut1 and a wireless power receiving device Ur.

The wireless power feeding device Ut1 includes a power source PW, an inverter INV, and a power feeding coil unit Ltu1. The power source PW supplies direct-current (DC) power to the inverter INV, described below. The power source PW is not limited to any particular one, and may be any power source that outputs DC power. Examples of such a power source may include a DC power source that is generated by rectifying and smoothing a commercial alternating-current (AC) power source, a secondary battery, a solar photovoltaic DC power source, and a switching power source device such as a switching converter.

The inverter INV has a function to convert input DC power supplied from the power source PW into AC power. In this embodiment, the inverter INV converts input DC power supplied from the power source PW into AC power, and supplies the AC power to the power feeding coil unit Ltu1 described below. The inverter INV may be implemented as a switching circuit having a plurality of switching elements bridge-connected. Examples of the switching elements of the switching circuit may include metal oxide semiconductor-field effect transistor (MOSFET) elements and insulated gate bipolar transistor (IGBT) elements.

The power feeding coil unit Ltu1 includes a first power feeding coil Lta, a second power feeding coil Ltb, a first auxiliary coil Lca, a second auxiliary coil Lcb, and a magnetic body F1. In this embodiment, as illustrated in FIG. 1, four coils, that is, the first and second power feeding coils Lta and Ltb and the first and second auxiliary coils Lca and Lcb, are electrically connected in series with one another. In a case where the wireless power transmission device S1 according to this embodiment is used for an electric power supply facility for a vehicle such as an electric vehicle, the power feeding coil unit Ltu1 will be installed in or on, or near, the ground.

The individual coils included in the power feeding coil unit Ltu1 will now be described with reference to FIG. 2. The first power feeding coil Lta includes a magnetic core Cta and a wire Wta. The first power feeding coil Lta is a planar-shaped spiral coil having a substantially rectangular shape, and is formed by winding the wire Wta, which is made of a Litz wire such as a copper wire or an aluminum wire, around the magnetic core Cta. The axial direction of the first power feeding coil Lta is parallel to the opposing direction of the first and second power feeding coils Lta and Ltb and a power receiving coil Lr described below. The number of turns of the first power feeding coil Lta is appropriately set on the basis of the separation distance between the first power feeding coil Lta and the power receiving coil Lr described below, the desired power transmission efficiency, and so forth.

The second power feeding coil Ltb includes a magnetic core Ctb and a wire Wtb. The second power feeding coil Ltb is a planar-shaped spiral coil having a substantially rectangular shape, and is formed by winding the wire Wtb, which is made of a Litz wire such as a copper wire or an aluminum wire, around the magnetic core Ctb. The axial direction of the second power feeding coil Ltb is parallel to the opposing direction of the first and second power feeding coils Lta and Ltb and the power receiving coil Lr described below. The second power feeding coil Ltb is apposed in the same plane as the first power feeding coil Lta. The arrangement interval between the first and second power feeding coils Lta and Ltb and the number of turns of the second power feeding coil Ltb are appropriately set on the basis of the separation distance between the second power feeding coil Ltb and the power receiving coil Lr described below, the desired power transmission efficiency, and so forth. The first and second power feeding coils Lta and Ltb have a function to wirelessly feed the AC power supplied from the inverter INV to the power receiving coil Lr described below.

In addition, the first power feeding coil Lta and the second power feeding coil Ltb are configured such that a magnetic path interlinking the power feeding coils Lta and Ltb is formed by magnetic fields respectively generated by the power feeding coils Lta and Ltb. In this case, the power feeding coils Lta and Ltb efficiently generate a magnetic flux that interlinks with the power receiving coil Lr described below, enabling an improvement in power transmission efficiency. Specifically, the first power feeding coil Lta and the second power feeding coil Ltb generate a magnetic flux that circulates so as to interlink the power feeding coils Lta and Ltb. The magnetic flux that circulates through the power feeding coils Lta and Ltb interlinks with the first power feeding coil Lta and interlinks with the second power feeding coil Ltb in opposite directions. In order to form a magnetic path interlinking the power feeding coils Lta and Ltb, it may be sufficient to electrically connect the first power feeding coil Lta and the second power feeding coil Ltb to each other so that the direction of the magnetic field generated by the first power feeding coil Lta and the direction of the magnetic field generated by the second power feeding coil Ltb are opposite to each other. That is, in a case where the first power feeding coil Lta and the second power feeding coil Ltb are wound in the same direction, it may be sufficient to connect the first and second power feeding coils Lta and Ltb so that the direction of the current flowing in the first power feeding coil Lta and the direction of the current flowing in the second power feeding coil Ltb are opposite to each other. Alternatively, in a case where the first power feeding coil Lta and the second power feeding coil Ltb are wound in opposite directions, it may be sufficient to connect the first and second power feeding coils Lta and Ltb so that the direction of the current flowing in the first power feeding coil Lta and the direction of the current flowing in the second power feeding coil Ltb are the same. Note that the direction of a magnetic flux that circulates so as to interlink the power feeding coils Lta and Ltb is the direction of circulation of the magnetic flux generated by a "power feeding coil".

The first auxiliary coil Lca includes a magnetic core Cca and a wire Wca. The first auxiliary coil Lca is a solenoid coil wound in a helical shape, and is formed by winding the wire Wca, which is made of a Litz wire such as a copper wire or an aluminum wire, around the magnetic core Cca, which is shaped into a plate or a bar. The axial direction of the first auxiliary coil Lca is nonparallel to the opposing direction of the first and second power feeding coils Lta and Ltb and the power receiving coil Lr described below. The configuration described above allows the magnetic flux generated by the first auxiliary coil Lca to easily circulate also in a location away from the first auxiliary coil Lca without interlinking with the power receiving coil Lr described below. In this embodiment, the axial direction of the first auxiliary coil Lca is perpendicular to the opposing direction of the first and second power feeding coils Lta and Ltb and the power receiving coil Lr described below. In this case, the first auxiliary coil Lca more facilitates the generation of a magnetic flux circulating also in a location away from the first auxiliary coil Lca.

In addition, the first auxiliary coil Lca is arranged not to interlink with a magnetic flux interlinking with the power receiving coil Lr described below, that is arranged to face the first and second power feeding coils Lta and Ltb during power feeding. That is, the magnetic flux contributing to power transmission is not canceled out using the first auxiliary coil Lca. Thus, a reduction in power transmission efficiency may be prevented or minimized. In this embodiment, as illustrated in FIG. 2, the first auxiliary coil Lca is arranged on the opposite to the side of the first and second power feeding coils Lta and Ltb facing the power receiving coil Lr described below. More specifically, the first auxiliary coil Lca is arranged so as to overlap the first power feeding coil Lta when viewed from the opposing direction of the first and second power feeding coils Lta and Ltb and the power receiving coil Lr described below. The arrangement described above allows the first auxiliary coil Lca to easily generate a magnetic flux that enhances a magnetic field between the first power feeding coil Lta and the power receiving coil Lr described below. That is, the magnetic flux generated by the first power feeding coil Lta and the magnetic flux generated by the first auxiliary coil Lca are oriented in substantially the same direction between the first power feeding coil Lta and the power receiving coil Lr described below. Accordingly, the magnetic flux interlinking both the first power feeding coil Lta and the power receiving coil Lr described below, which contributes to power transmission, is not canceled by the magnetic flux generated by the first auxiliary coil Lca. As a result, a reduction in power transmission efficiency may further be prevented or minimized. In addition, the first auxiliary coil Lca and the first power feeding coil Lta are arranged so as to be closer to each other. Thus, the density distribution of the magnetic flux generated by the first auxiliary coil Lca in a location away from the first power feeding coil Lta may be made closer to the density distribution of the magnetic flux generated by the first power feeding coil Lta.

Furthermore, the direction of circulation of the magnetic flux generated by the first auxiliary coil Lca is opposite to the direction of circulation of the magnetic flux generated by the first and second power feeding coils Lta and Ltb. Specifically, in FIG. 2, when the magnetic flux generated by the first and second power feeding coils Lta and Ltb interlinks the first power feeding coil Lta in the direction from the first power feeding coil Lta to the power receiving coil Lr described below (i.e., vertically upward in FIG. 2) and interlinks the second power feeding coil Ltb in the direction from the power receiving coil Lr described below to the second power feeding coil Ltb (i.e., vertically downward in FIG. 2), the first auxiliary coil Lca generates a magnetic flux interlinking in the direction from the first auxiliary coil Lca to a center portion of the first power feeding coil Lta (i.e., horizontally rightward in FIG. 2). Thus, the direction of circulation of the magnetic flux generated by the first auxiliary coil Lca is opposite to the direction of circulation of the magnetic flux generated by the first and second power feeding coils Lta and Ltb. Alternatively, in FIG. 2, when the magnetic flux generated by the first and second power feeding coils Lta and Ltb interlinks the first power feeding coil Lta in the direction from the power receiving coil Lr described below to the first power feeding coil Lta (i.e., vertically downward in FIG. 2) and interlinks the second power feeding coil Ltb in the direction from the second power feeding coil Ltb to the power receiving coil Lr described below (i.e., vertically upward in FIG. 2), the first auxiliary coil Lca generates a magnetic flux interlinking in the direction from the center portion of the first power feeding coil Lta to the first auxiliary coil Lca (i.e.; horizontally leftward in FIG. 2). Thus, the direction of circulation of the magnetic flux generated by the first auxiliary coil Lca is opposite to the direction of circulation of the magnetic flux generated by the first and second power feeding coils Lta and Ltb. In order to generate the magnetic flux described above, it may be sufficient to wind the wire Wca of the first auxiliary coil Lca around the magnetic core Cca so that the direction of the current flowing through a portion of the wire Wca of the first auxiliary coil Lca in closest proximity to the wire Wta of the first power feeding coil Lta (i.e., the upper portion of the wire Wca of the first auxiliary coil Lca in FIG. 2) is the same as the direction of the current flowing through a portion of the wire Wta of the first power feeding coil Lta in closest proximity to the wire Wca of the first auxiliary coil Lca (i.e., the left-hand portion of the wire Wta of the first power feeding coil Lta in FIG. 2). With the configuration described above, in locations away from the first power feeding coil Lta and the first auxiliary coil Lca, which are magnetic flux generators, the magnetic flux generated by the first power feeding coil Lta and the magnetic flux generated by the first auxiliary coil Lca are oriented in opposite directions, allowing the magnetic flux generated by the first power feeding coil Lta and the magnetic flux generated by the first auxiliary coil Lca to be canceled by each other. The strength of a magnetic field formed in a location away from the first power feeding coil Lta is reduced. Accordingly, a reduction in the unwanted leakage magnetic field formed in a location away from the first and second power feeding coils Lta and Ltb may be achieved.

The second auxiliary coil Lcb includes a magnetic core Ccb and a wire Wcb. The second auxiliary coil Lcb is a solenoid coil wound in a helical shape, and is formed by winding the wire Wcb, which is made of a Litz wire such as a copper wire or an aluminum wire, around the magnetic core Ccb, which is shaped into a plate or a bar. The axial direction of the second auxiliary coil Lcb is nonparallel to the opposing direction of the first and second power feeding coils Lta and Ltb and the power receiving coil Lr described below. The configuration described above allows the magnetic flux generated by the second auxiliary coil Lcb to easily circulate also in a location away from the second auxiliary coil Lcb without interlinking with the power receiving coil Lr described below. In this embodiment, the axial direction of the second auxiliary coil Lcb is perpendicular to the opposing direction of the first and second power feeding coils Lta and Ltb and the power receiving coil Lr described below. In this case, the second auxiliary coil Lcb more facilitates the generation of a magnetic flux circulating also in a location away from the second auxiliary coil Lcb.

In addition, the second auxiliary coil Lcb is arranged not to interlink with a magnetic flux interlinking with the power receiving coil Lr described below, that is arranged to face the first and second power feeding coils Lta and Ltb during power feeding. That is, the magnetic flux contributing to power transmission is not canceled out using the second auxiliary coil Lcb. Thus, a reduction in power transmission efficiency may be prevented or minimized. In this embodiment, as illustrated in FIG. 2, the second auxiliary coil Lcb is arranged on the opposite to the side of the first and second power feeding coils Lta and Ltb facing the power receiving coil Lr described below. More specifically, the second auxiliary coil Lcb is arranged so as to overlap the second power feeding coil Ltb when viewed from the opposing direction of the first and second power feeding coils Lta and Ltb and the power receiving coil Lr described below. The arrangement described above allows the second auxiliary coil Lcb to easily generate a magnetic flux that enhances a magnetic field between the second power feeding coil Ltb and the power receiving coil Lr described below. That is, the magnetic flux generated by the second power feeding coil Ltb and the magnetic flux generated by the second auxiliary coil Lcb are oriented in substantially the same direction between the second power feeding coil Ltb and the power receiving coil Lr described below. Accordingly, the magnetic flux interlinking both the second power feeding coil Ltb and the power receiving coil Lr described below, which contributes to power transmission, is not canceled by the magnetic flux generated by the second auxiliary coil Lcb. As a result, a reduction in power transmission efficiency may further be prevented or minimized. In addition, the second auxiliary coil Lcb and the second power feeding coil Ltb are arranged so as to be closer to each other. Thus, the density distribution of the magnetic flux generated by the second auxiliary coil Lcb in a location away from the second power feeding coil Ltb may be made closer to the density distribution of the magnetic flux generated by the second power feeding coil Ltb.

Furthermore, the direction of circulation of the magnetic flux generated by the second auxiliary coil Lcb is opposite to the direction of circulation of the magnetic flux generated by the first and second power feeding coils Lta and Ltb. Specifically, in FIG. 2, when the magnetic flux generated by the first and second power feeding coils Lta and Ltb interlinks the first power feeding coil Lta in the direction from the first power feeding coil Lta to the power receiving coil Lr described below (i.e., vertically upward in FIG. 2) and interlinks the second power feeding coil Ltb in the direction from the power receiving coil Lr described below to the second power feeding coil Ltb (i.e., vertically downward in FIG. 2), the second auxiliary coil Lcb generates a magnetic flux interlinking in the direction from a center portion of the second power feeding coil Ltb to the second auxiliary coil Lcb (i.e., horizontally rightward in FIG. 2). Thus, the direction of circulation of the magnetic flux generated by the second auxiliary coil Lcb is opposite to the direction of circulation of the magnetic flux generated by the first and second power feeding coils Lta and Ltb. Alternatively, in FIG. 2, when the magnetic flux generated by the first and second power feeding coils Lta and Ltb interlinks the first power feeding coil Lta in the direction from the power receiving coil Lr described below to the first power feeding coil Lta (i.e., vertically downward in FIG. 2) and interlinks the second power feeding coil Ltb in the direction from the second power feeding coil Ltb to the power receiving coil Lr described below (i.e., vertically upward in FIG. 2), the second auxiliary coil Lcb generates a magnetic flux interlinking in the direction from the second auxiliary coil Lcb to the center portion of the second power feeding coil Ltb (i.e., horizontally leftward in FIG. 2). Thus, the direction of circulation of the magnetic flux generated by the second auxiliary coil Lcb is opposite to the direction of circulation of the magnetic flux generated by the first and second power feeding coils Lta and Ltb. In order to generate the magnetic flux described above, it may be sufficient to wind the wire Wcb of the second auxiliary coil Lcb around the magnetic core Ccb so that the direction of the current flowing through a portion of the wire Wcb of the second auxiliary coil Lcb in closest proximity to the wire Wtb of the second power feeding coil Ltb (i.e., the upper portion of the wire Wcb of the second auxiliary coil Lcb in FIG. 2) is the same as the direction of the current flowing through a portion of the wire Wtb of the second power feeding coil Ltb in most proximity to the wire Wcb of the second auxiliary coil Lcb (i.e., the right-hand portion of the wire Wtb of the second power feeding coil Ltb in FIG. 2). With the configuration described above, in locations away from the second power feeding coil Ltb and the second auxiliary coil Lcb, which are magnetic flux generators, the magnetic flux generated by the second power feeding coil Ltb and the magnetic flux generated by the second auxiliary coil Lcb are oriented in opposite directions, allowing the magnetic flux generated by the second power feeding coil Ltb and the magnetic flux generated by the second auxiliary coil Lcb to be canceled by each other. The strength of a magnetic field formed in a location away from the second power feeding coil Ltb is reduced. Accordingly, a reduction in the unwanted leakage magnetic field formed in a location away from the first and second power feeding coils Lta and Ltb may be achieved.

The first auxiliary coil Lca and the second auxiliary coil Lcb are arranged so that the center portion of the first power feeding coil Lta and the center portion of the second power feeding coil Ltb are located between a center portion of the first auxiliary coil Lca and a center portion of the second auxiliary coil Lcb. Specifically, the first auxiliary coil Lca and the second auxiliary coil Lcb are arranged so that the center portion of the first auxiliary coil Lca and the center portion of the second auxiliary coil Lcb are located on both outer sides of the first and second power feeding coils Lta and Ltb in the direction of alignment of the first and second power feeding coils Lta and Ltb. In this case, the first and second auxiliary coils Lca and Lcb are arranged on both outer sides of the first and second power feeding coils Lta and Ltb. Thus, a further reduction in an unwanted leakage magnetic field formed in a location away from the first and second power feeding coils Lta and Ltb may be achieved.

The magnetic body F1 extends along a surface on the opposite to the side of the first and second power feeding coils Lta and Ltb facing the power receiving coil Lr described below. In this embodiment, as illustrated in FIG. 2, the magnetic body F1 is connected to each of the magnetic core Cta of the first power feeding coil Lta and the magnetic core Ctb of the second power feeding coil Ltb near either end of the surface on a side of the magnetic body F1 closer to the power receiving coil Lr described below (i.e., the upper surface in FIG. 2) in the opposing direction of the first and second power feeding coils Lta and Ltb and the power receiving coil Lr described below. As illustrated in FIG. 2, the magnetic body F1 is further connected to each of the magnetic core Cca of the first auxiliary coil Lca and the magnetic core Ccb of the second auxiliary coil Lcb on either side surface (i.e., the left and right side surfaces in FIG. 2) of the magnetic body F1 in the direction of alignment of the first and second power feeding coils Lta and Ltb. The configuration described above allows the magnetic core Cca of the first auxiliary coil Lca and the magnetic core Ccb of the second auxiliary coil Lcb to be coupled to the magnetic core Cta of the first power feeding coil Lta and the magnetic core Ctb of the second power feeding coil Ltb, respectively, via the magnetic body F1. Thus, the first auxiliary coil Lca easily generates a magnetic flux that enhances a magnetic field between the first power feeding coil Lta and the power receiving coil Lr described below, and the second auxiliary coil Lcb easily generates a magnetic flux that enhances a magnetic field between the second power feeding coil Ltb and the power receiving coil Lr described below. That is, the magnetic flux generated by the first power feeding coil Lta and the magnetic flux generated by the first auxiliary coil Lca are oriented in substantially the same direction between the first power feeding coil Lta and the power receiving coil Lr described below, and the magnetic flux generated by the second power feeding coil Ltb and the magnetic flux generated by the second auxiliary coil Lcb are oriented in substantially the same direction between the second power feeding coil Ltb and the power receiving coil Lr described below. Accordingly, the magnetic flux interlinking all of the first and second power feeding coils Lta and Ltb and the power receiving coil Lr described below, which contributes to power transmission, is not canceled by the magnetic flux generated by the first and second auxiliary coils Lca and Lcb. As a result, a reduction in power transmission efficiency may further be prevented or minimized.

As illustrated in FIG. 1, the wireless power receiving device Ur includes the power receiving coil Lr and a rectifier circuit DB.

As illustrated in FIG. 2, the power receiving coil Lr includes a magnetic core Cr and a wire Wr. The power receiving coil Lr is a solenoid coil wound in a helical shape, and is formed by winding the wire Wr around the magnetic core Cr, which is shaped into a plate or a bar. The power receiving coil Lr has a function to receive the AC power fed from the first and second power feeding coils Lta and Ltb of the power feeding coil unit Ltu1. In a case where the wireless power transmission device S1 according to this embodiment is used for an electric power supply facility for a vehicle such as an electric vehicle, the power receiving coil Lr will be mounted on the bottom of the vehicle.

The rectifier circuit DB has a function to rectify the AC power received by the power receiving coil Lr to DC power. Examples of the rectifier circuit DB may include a converter circuit having a full-wave rectifying function that uses a diode bridge and a power smoothing function that uses a capacitor and a three-terminal regulator. The DC power obtained by rectification by the rectifier circuit DB is output to a load R. Examples of the load R may include, in a case where the wireless power transmission device S1 according to this embodiment is used for an electric power supply facility for a vehicle such as an electric vehicle, a secondary battery and a rotating machine that are included in the vehicle. In a case where the load R is an AC rotating machine, the wireless power receiving device Ur will require an additional inverter (not illustrated) between the rectifier circuit DB and the load R to supply AC power to the AC rotating machine.

The relative relationship between a magnetic flux generated by a power feeding coil and a magnetic flux generated by an auxiliary coil and the effect of reducing the unwanted leakage magnetic field in this embodiment will now be described in detail with reference to FIGS. 3A and 3B. FIG. 3A is a diagram schematically illustrating the magnetic flux generated by the first and second power feeding coils Lta and Ltb in FIG. 2. FIG. 3B is a diagram schematically illustrating the magnetic flux generated by the first and second power feeding coils Lta and Ltb and the first and second auxiliary coils Lca and Lcb in FIG. 2. In FIG. 3A, magnetic fluxes Bt1$a$ to Bt1$d$ are illustrated as typical magnetic fluxes generated by the first and second power feeding coils Lta and Ltb. In FIG. 3B, magnetic fluxes Bt1$a$ to Bt1$d$ are illustrated as typical magnetic fluxes generated by the first and second power feeding coils Lta and Ltb, and magnetic fluxes Bc1$a$ to Bc1$d$ are schematically illustrated as typical magnetic fluxes generated by the first and second auxiliary coils Lca and Lcb. Note that the illustrated magnetic fluxes schematically depict only the orientations of the individual magnetic fluxes, and do not depict the magnetic flux densities. In FIG. 3A and FIG. 3B, the magnetic flux in the magnetic cores Cta and Ctb of the first and second power feeding coils Lta and Ltb, the magnetic cores Cca and Ccb of the first and second auxiliary coils Lca and Lcb, the magnetic body F1, and the magnetic core Cr of the power receiving coil Lr is not illustrated.

First, the magnetic flux generated by the first and second power feeding coils Lta and Ltb will be described with reference to FIG. 3A. As illustrated in FIG. 3A, the first and second power feeding coils Lta and Ltb generate the magnetic fluxes Bt1a to Bt1d that interlink the first power feeding coil Lta in the direction from the first power feeding coil Lta to the power receiving coil Lr (i.e., vertically upward in FIG. 3A) and that interlink the second power feeding coil Ltb in the direction from the power receiving coil Lr to the second power feeding coil Ltb (i.e., vertically downward in FIG. 3A). That is, the first and second power feeding coils Lta and Ltb generate the magnetic fluxes Bt1a to Bt1d circulating in the same direction. In the illustrated example, the magnetic fluxes Bt1a to Bt1d generated by the first and second power feeding coils Lta and Ltb include magnetic fluxes Bt1a and Bt1b that interlink with the power receiving coil Lr and that contribute to power transmission, and magnetic fluxes Bt1c and Bt1d that circulate in a location away from the first and second power feeding coils Lta and Ltb without interlinking with the power receiving coil Lr. The interlinking of the magnetic fluxes Bt1a and Bt1b with the power receiving coil Lr induces an electromotive force in the wire Wr of the power receiving coil Lr. The power generated in the power receiving coil Lr is rectified by the rectifier circuit DB, and is output to the load R. In this embodiment, a magnetic path interlinking the first and second power feeding coils Lta and Ltb is formed by magnetic fields respectively generated by the first power feeding coil Lta and the second power feeding coil Ltb, enabling efficient generation of the magnetic fluxes Bt1a and Bt1b. Thus, the magnetic flux density of the magnetic fluxes Bt1a and Bt1b that circulate in the vicinity of the first and second power feeding coils Lta and Ltb is significantly higher than that of the magnetic fluxes Bt1c and Bt1d that largely circulate also in a location away from the first and second power feeding coils Lta and Ltb. That is, a large proportion of the magnetic flux generated by the first and second power feeding coils Lta and Ltb interlinks with the power receiving coil Lr. As a result, the coupling between the first and second power feeding coils Lta and Ltb and the power receiving coil Lr is high, and the power transmission efficiency is also high. The magnetic fluxes Bt1a to Bt1d generated by the first and second power feeding coils Lta and Ltb do not interlink with the first and second auxiliary coils Lca and Lcb, and the magnetic fluxes Bt1a and Bt1b, which contribute to power transmission, are not canceled out using the first and second auxiliary coils Lca and Lcb. Thus, a reduction in power transmission efficiency may be prevented or minimized.

The magnetic flux generated by the first and second auxiliary coils Lca and Lcb will now be described with reference to FIG. 3B. The magnetic fluxes Bt1a to Bt1d generated by the first and second power feeding coils Lta and Ltb in FIG. 3B are as illustrated in FIG. 3A. As illustrated in FIG. 3B, the first auxiliary coil Lca generates magnetic fluxes Bc1a and Bc1b that interlink the first auxiliary coil Lca in the direction from the first auxiliary coil Lca to the center portion of the first power feeding coil Lta (i.e., horizontally rightward in FIG. 3B) and that interlink the first power feeding coil Lta in the direction from the first power feeding coil Lta to the power receiving coil Lr (i.e., vertically upward in FIG. 3B). Specifically, in this embodiment, since the axial direction of the first auxiliary coil Lca is nonparallel to the opposing direction of the first and second power feeding coils Lta and Ltb and the power receiving coil Lr, the magnetic fluxes Bc1a and Bc1b generated by the first auxiliary coil Lca circulate in a location away from the first auxiliary coil Lca without interlinking with the power receiving coil Lr. In particular, in this embodiment, since the axial direction of the first auxiliary coil Lca is perpendicular to the opposing direction of the first and second power feeding coils Lta and Ltb and the power receiving coil Lr, the magnetic fluxes Bc1a and Bc1b generated by the first auxiliary coil Lca largely circulate also in a location away from the first auxiliary coil Lca. In addition, the first auxiliary coil Lca is arranged on the opposite to the side of the first and second power feeding coils Lta and Ltb facing the power receiving coil Lr. Thus, the magnetic fluxes Bc1a and Bc1b generated by the first auxiliary coil Lca interlink with the first power feeding coil Lta.

Likewise, as illustrated in FIG. 3B, the second auxiliary coil Lcb generates magnetic fluxes Bc1c and Bc1d that interlink the second auxiliary coil Lcb in the direction from the second power feeding coil Ltb to the second auxiliary coil Lcb (i.e., horizontally rightward in FIG. 3B) and that interlink the second power feeding coil Ltb in the direction from the power receiving coil Lr to the second power feeding coil Ltb (i.e., vertically downward in FIG. 3B). Specifically, in this embodiment, since the axial direction of the second auxiliary coil Lcb is nonparallel to the opposing direction of the first and second power feeding coils Lta and Ltb and the power receiving coil Lr, the magnetic fluxes Bc1c and Bc1d generated by the second auxiliary coil Lcb circulate in a location away from the second auxiliary coil Lcb without interlinking with the power receiving coil Lr. In particular, in this embodiment, since the axial direction of the second auxiliary coil Lcb is perpendicular to opposing the direction of the first and second power feeding coils Lta and Ltb and the power receiving coil Lr, the magnetic fluxes Bc1c and Bc1d generated by the second auxiliary coil Lcb largely circulate also in a location away from the second auxiliary coil Lcb. In addition, since the second auxiliary coil Lcb is arranged on the opposite to the side of the first and second power feeding coils Lta and Ltb facing the power receiving coil Lr, the magnetic fluxes Bc1c and Bc1d generated by the second auxiliary coil Lab interlink with the second power feeding coil Ltb.

Next, the effect of reducing the unwanted leakage magnetic field in this embodiment will be described. As described above, the first and second power feeding coils Lta and Ltb generate the magnetic fluxes Bt1c and Bt1d that circulate in a location away from the first and second power feeding coils Lta and Ltb. The magnetic fluxes Bt1c and Bt1d do not contribute to power transmission because of not interlinking with the power receiving coil Lr, and become magnetic fluxes that form an unwanted leakage magnetic field around the first and second power feeding coils Lta and Ltb, although the magnetic fluxes Bt1c and Bt1d have a significantly lower magnetic flux density than the magnetic fluxes Bt1a and Bt1b that circulate in the vicinity of the first and second power feeding coils Lta and Ltb. In this embodiment, the direction of circulation of the magnetic fluxes Bc1a and Bc1b generated by the first auxiliary coil Lca and the direction of circulation of the magnetic fluxes Bc1c and Bc1d generated by the second auxiliary coil Lcb are opposite to the direction of circulation of the magnetic fluxes Bt1a to Bt1d generated by the first and second power feeding coils Lta and Ltb. Accordingly, as illustrated in FIG. 3B, the magnetic fluxes Bt1c and Bt1d generated by the first and second power feeding coils Lta and Ltb and the magnetic fluxes Bc1a to Bc1d generated by the first and second auxiliary coils Lca and Lcb are oriented in opposite directions in a location away from the first and second power feeding coils Lta and Ltb. That is, the magnetic fluxes Bt1$c$ and Bt1$d$ generated by the first and second power feeding coils Lta and Ltb are canceled by the magnetic fluxes Bc1$a$ to Bc1$d$ generated by the first and second auxiliary coils Lca and Lcb in a location away from the first and second power feeding coils Lta and Ltb. Here, a magnetic field is represented by a magnetic flux density. Due to the cancellation of the magnetic fluxes Bt1$c$ and Bt1$d$ generated by the first and second power feeding coils Lta and Ltb, which form the unwanted leakage magnetic field, the magnetic flux density of the magnetic fluxes Bt1$c$ and Bt1$d$ decreases. As a result, the unwanted leakage magnetic field may be reduced.

On the other hand, the magnetic fluxes Bt1$a$ and Bt1$b$ generated by the first and second power feeding coils Lta and Ltb and the magnetic fluxes Bc1$a$ and Bc1$b$ generated by the first auxiliary coil Lca are oriented in substantially the same direction in the vicinity of the first power feeding coil Lta. That is, the magnetic field generated by the first auxiliary coil Lca enhances a part of the magnetic field between the first power feeding coil Lta and the power receiving coil Lr. In this manner, the magnetic fluxes Bt1$a$ and Bt1$b$ generated by the first power feeding coil Lta and the magnetic fluxes Bc1$a$ and Bc1$b$ generated by the first auxiliary coil Lca are oriented in substantially the same direction between the first power feeding coil Lta and the power receiving coil Lr. Accordingly, the magnetic fluxes Bt1$a$ and Bt1$b$ interlinking both the first power feeding coil Lta and the power receiving coil Lr, which contribute to power transmission, are not canceled by the magnetic fluxes Bc1$a$ and Bc1$b$ generated by the first auxiliary coil Lca. As a result, a reduction in power transmission efficiency may be prevented or minimized. Similarly, the magnetic fluxes Bt1$a$ and Bt1$b$ generated by the first and second power feeding coils Lta and Ltb and the magnetic fluxes Bc1$c$ and Bc1$d$ generated by the second auxiliary coil Lcb are oriented in substantially the same direction in the vicinity of the second power feeding coil Ltb. That is, the magnetic field generated by the second auxiliary coil Lcb enhances a part of the magnetic field between the second power feeding coil Ltb and the power receiving coil Lr. In this manner, the magnetic fluxes Bt1$a$ and Bt1$b$ generated by the second power feeding coil Ltb and the magnetic fluxes Bc1$c$ and Bc1$d$ generated by the second auxiliary coil Lcb are oriented in substantially the same direction between the second power feeding coil Ltb and the power receiving coil Lr. Accordingly, the magnetic fluxes Bt1$a$ and Bt1$b$ interlinking both the second power feeding coil Ltb and the power receiving coil Lr, which contribute to power transmission, are not canceled by the magnetic fluxes Bc1$c$ and Bc1$d$ generated by the second auxiliary coil Lcb. As a result, a reduction in power transmission efficiency may be prevented or minimized.

In this manner, the magnetic fluxes Bc1$a$ to Bc1$d$ generated by the first and second auxiliary coils Lca and Lcb do not cancel the magnetic fluxes Bt1$a$ and Bt1$b$ that is generated by the first and second power feeding coil Lta and Ltb and are interlinking with the power receiving coil Lr, and the magnetic flux Bc1$a$ to Bc1$d$ generated by the first and second auxiliary coil Lca and Lcb cancel the magnetic flux Bt1$c$ and Bt1$d$ that is generated by the first and second power feeding coil Lta and Ltb and is not interlinking with the power receiving coil Lr. This may prevent or minimize a reduction in power transmission efficiency while reducing an unwanted leakage magnetic field formed in a location away from the first and second power feeding coils Lta and Ltb.

In the manner described above, in the power feeding coil unit Ltu1 according to this embodiment, the axial direction of the first and second auxiliary coils Lca and Lcb is nonparallel to the opposing direction of the first and second power feeding coils Lta and Ltb and the power receiving coil Lr. This allows the magnetic fluxes Bc1$a$ to Bc1$d$ generated by the first and second auxiliary coils Lca and Lcb to easily circulate also in a location away from the first and second auxiliary coils Lca and Lcb without interlinking with the power receiving coil Lr. In this state, the direction of circulation of the magnetic fluxes Bc1$a$ to Bc1$d$ generated by the first and second auxiliary coils Lca and Lcb is opposite to the direction of circulation of the magnetic fluxes Bt1$a$ to Bt1$d$ generated by the first and second power feeding coils Lta and Ltb. In locations away from the first and second power feeding coils Lta and Ltb and the first and second auxiliary coils Lca and Lcb, which are magnetic flux generators, therefore, the magnetic fluxes Bt1$c$ and Bt1$d$ generated by the first and second power feeding coils Lta and Ltb and the magnetic fluxes Bc1$a$ to Bc1$d$ generated by the first and second auxiliary coils Lca and Lcb are oriented in opposite directions, allowing the magnetic fluxes Bt1$c$ and Bt1$d$ generated by the first and second power feeding coils Lta and Ltb and the magnetic fluxes Bc1$a$ to Bc1$d$ generated by the first and second auxiliary coils Lca and Lcb to be canceled by each other. The strength of a magnetic field formed in a location away from the first and second power feeding coils Lta and Ltb is reduced. In addition, the first and second auxiliary coils Lca and Lcb are arranged not to interlink with the magnetic fluxes Bt1$a$ and Bt1$b$ interlinking with the power receiving coil Lr arranged to face the first and second power feeding coils Lta and Ltb during power feeding. Thus, the magnetic fluxes Bt1$a$ and Bt1$b$, which contribute to power transmission, are not canceled out using the first and second auxiliary coils Lca and Lcb. Accordingly, a reduction in power transmission efficiency may be prevented or minimized with a reduction in an unwanted leakage magnetic field formed in a location away from the first and second power feeding coils Lta and Ltb.

Second Embodiment

Figure 4:
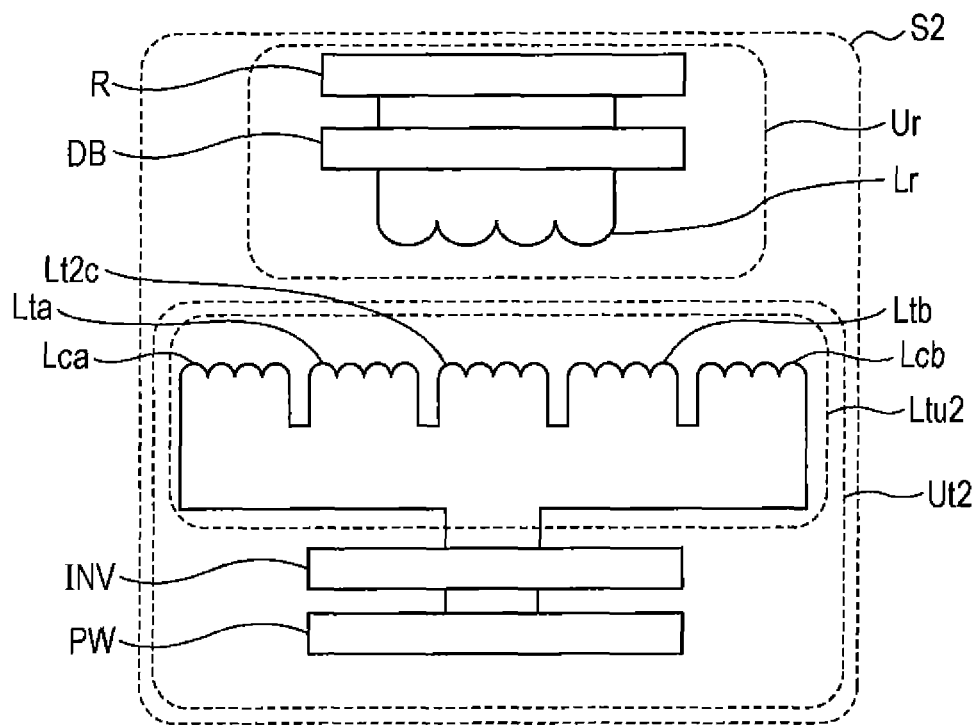
FIG. 4 is a system configuration diagram illustrating a wireless power transmission device according to a second embodiment of the present invention together with a load.
Figure 5:
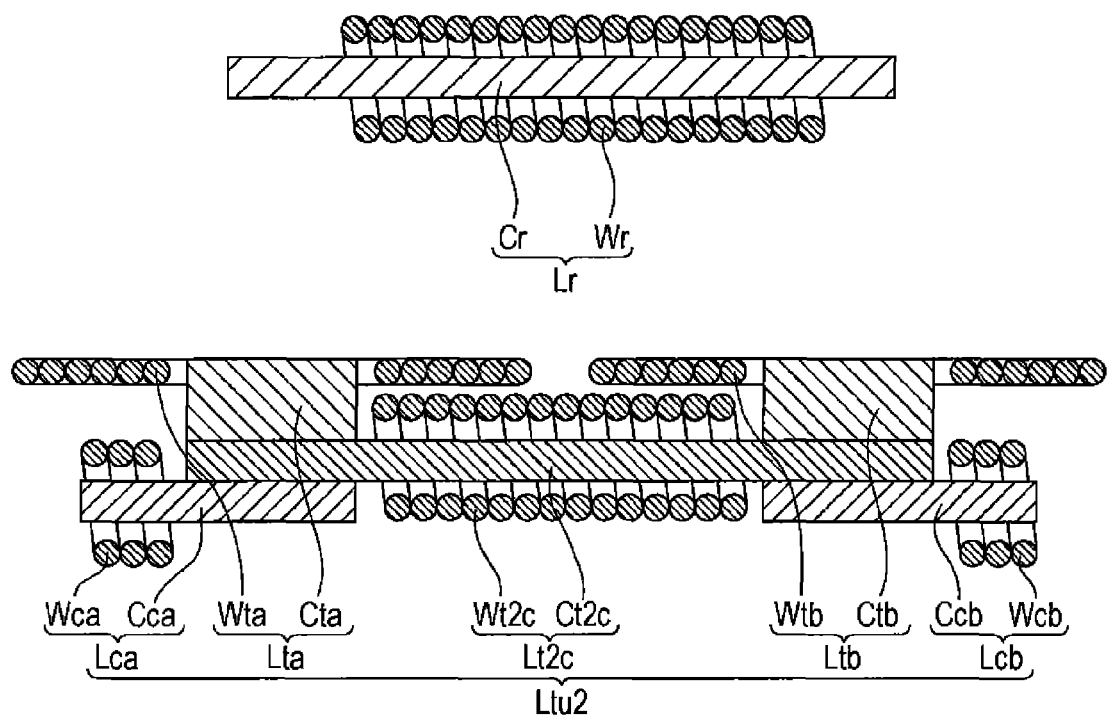
FIG. 5 is a cross-sectional view illustrating a power feeding coil unit according to the second embodiment of the present invention together with a power receiving coil.

Next, a configuration of a wireless power transmission device S2 according to a second embodiment of the present invention will be described with reference to FIG. 4 and FIG. 5. FIG. 4 is a system configuration diagram illustrating a wireless power transmission device according to the second embodiment of the present invention together with a load. FIG. 5 is a cross-sectional view illustrating a power feeding coil unit according to the second embodiment of the present invention together with a power receiving coil.

As illustrated in FIG. 4, the wireless power transmission device S2 includes a wireless power feeding device Ut2 and a wireless power receiving device Ur.

The wireless power feeding device Ut2 includes a power source PW, an inverter INV, and a power feeding coil unit Ltu2. The configuration of the power source PW and the inverter INV is similar to that in the wireless power transmission device S1 according to the first embodiment. The wireless power transmission device S2 according to this embodiment is different from the wireless power transmission device S1 according to the first embodiment in that the wireless power transmission device S2 includes the power feeding coil unit Ltu2 in place of the power feeding coil unit Ltu1 of the wireless power transmission device S1 according to the first embodiment. The wireless power receiving device Ur is similar to the wireless power receiving device Ur in the wireless power transmission device S1 according to the first embodiment. In the following, a description will be given mainly of the differences from the first embodiment.

As illustrated in FIG. 4, the power feeding coil unit Ltu2 includes a first power feeding coil Lta, a second power feeding coil Ltb, a first auxiliary coil Lca, a second auxiliary coil Lcb, and an additional coil Lt2c. As illustrated in FIG. 4, the first power feeding coil Lta, the second power feeding coil Ltb, the first auxiliary coil Lca, the second auxiliary coil Lcb, and the additional coil Lt2c are electrically connected in series with one another. The coil configuration of the first power feeding coil Lta, the second power feeding coil Ltb, the first auxiliary coil Lca, and the second auxiliary coil Lcb is similar to that of the first power feeding coil Lta, the second power feeding coil Ltb, the first auxiliary coil Lca, and the second auxiliary coil Lcb in the first embodiment. The power feeding coil unit Ltu2 according to this embodiment is different from the power feeding coil unit Ltu1 according to the first embodiment in that the additional coil Lt2c is included in place of the magnetic body F1 of the power feeding coil unit Ltu1 according to the first embodiment.

As illustrated in FIG. 5, the additional coil Lt2c includes a magnetic core Ct2c and a wire Wt2c. The additional coil Lt2c is a solenoid coil wound in a helical shape, and is formed by winding the wire Wt2c, which is made of a Litz wire such as a copper wire or an aluminum wire, around the magnetic core Ct2c, which is shaped into a plate. As illustrated in FIG. 5, the additional coil Lt2c is arranged on the opposite to the side of the first and second power feeding coils Lta and Ltb facing the power receiving coil Lr so that a center portion of the additional coil Lt2c is located between a center portion of the first power feeding coil Lta and a center portion of the second power feeding coil Ltb. The magnetic core Ct2c of the additional coil Lt2c is connected to each of the magnetic core Cta of the first power feeding coil Lta and the magnetic core Ctb of the second power feeding coil Ltb near either end of the surface on a side of the magnetic core Ct2c of the additional coil Lt2c closer to the power receiving coil Lr (i.e., the upper surface in FIG. 5) in the opposing direction of the first and second power feeding coils Lta and Ltb and the power receiving coil Lr. In this case, the first and second power feeding coils Lta and Ltb and the additional coil Lt2c more efficiently generate a magnetic flux that interlinks with a power receiving coil Lr described below, enabling a further improvement in power transmission efficiency. The number of turns of the additional coil Lt2c is appropriately set on the basis of the desired power transmission efficiency and so forth.

The first power feeding coil Lta, the second power feeding coil Ltb, and the additional coil Lt2c are configured to form a magnetic path that interlinks the coils Lta, Ltb, and Lt2c by using magnetic fields respectively generated by the coils Lta, Ltb, and Lt2c. That is, the first power feeding coil Lta, the second power feeding coil Ltb, and the additional coil Lt2c generate a magnetic flux that circulates so as to interlink the coils Lta, Ltb, and Lt2c. As described above, the first power feeding coil Lta and the second power feeding coil Ltb are configured such that the directions of the magnetic fields generated by the coils Lta and Ltb are opposite to each other. That is, in FIG. 5, when the first power feeding coil Lta generates a magnetic flux interlinking in the direction from the first power feeding coil Lta to the power receiving coil Lr (i.e., vertically upward in FIG. 5), the second power feeding coil Ltb generates a magnetic flux interlinking in the direction from the power receiving coil Lr to the second power feeding coil Ltb (i.e., vertically downward in FIG. 5). In this case, accordingly, if the additional coil Lt2c generates a magnetic flux interlinking in the direction from the center portion of the second power feeding coil Ltb to the center portion of the first power feeding coil Lta (i.e., horizontally leftward in FIG. 5), the circulation of a magnetic flux interlinking with the coils Lta, Ltb, and Lt2c occurs. Similarly, in FIG. 5, when the first power feeding coil Lta generates a magnetic flux interlinking in the direction from the power receiving coil Lr to the first power feeding coil Lta (i.e., vertically downward in FIG. 5), the second power feeding coil Ltb generates a magnetic flux interlinking in the direction from the second power feeding coil Ltb to the power receiving coil Lr (i.e., vertically upward in FIG. 5). In this case, accordingly, if the additional coil Lt2c generates a magnetic flux interlinking in the direction from the center portion of the first power feeding coil Lta to the center portion of the second power feeding coil Ltb (i.e., horizontally rightward in FIG. 5), the circulation of a magnetic flux interlinking with the coils Lta, Ltb, and Lt2c occurs. In order to provide the additional coil Lt2c with the configuration described above, it may be sufficient to wind the wire Wt2c of the additional coil Lt2c around the magnetic core Ct2c so that the direction of the current flowing through portions of the wire Wt2c of the additional coil Lt2c in closest proximity to the wire Wta of the first power feeding coil Lta and the wire Wtb of the second power feeding coil Ltb (i.e., the upper side of the wire Wt2c of the additional coil Lt2c in FIG. 5) is the same as the direction of the current flowing through a portion of the wire Wta of the first power feeding coil Lta in closest proximity to the wire Wt2c of the additional coil Lt2c (i.e., the right side of the wire Wta of the first power feeding coil Lta in FIG. 5). Note that the direction of a magnetic flux that circulates so as to interlink the first and second power feeding coils Lta and Ltb and the additional coil Lt2c is the direction of circulation of the magnetic flux generated by a "power feeding coil".

In this embodiment, the power feeding coil unit Ltu2 includes the additional coil Lt2c in addition to the first power feeding coil Lta and the second power feeding coil Ltb, thereby efficiently generating a magnetic flux that contributes to power transmission, resulting in an increase in power transmission efficiency. In this case, in addition to the magnetic flux that contributes to power transmission, a magnetic flux that forms an unwanted leakage magnetic field might be generated. To address such a concern, for example, the number of turns of the first and second auxiliary coils Lca and Lcb may be increased to appropriately adjust the magnetic flux generated by the first and second auxiliary coils Lca and Lcb, thereby maintaining the desired effect of reducing the leakage magnetic field. Since the first and second auxiliary coils Lca and Lcb are not elements that consume electric energy, even an increase in the number of turns of the first and second auxiliary coils Lca and Lcb will not cause significant power loss, and a significant reduction in power transmission efficiency will not occur. Specifically, the energy consumed by the first and second auxiliary coils Lca and Lcb is only Joule heating generated by a small parasitic resistance of the wires Wca and Wcb of the first and second auxiliary coils Lca and Lcb.

In addition, as illustrated in FIG. 5, the magnetic core Ct2c of the additional coil Lt2c is connected to each of the magnetic core Cca of the first auxiliary coil Lca and the magnetic core Ccb of the second auxiliary coil Lcb near either end of the surface on a side of the magnetic core Ct2c opposite to the side of the magnetic core Ct2c closer to the power receiving coil Lr (i.e., the lower surface in FIG. 5) in the opposing direction of the first and second power feeding coils Lta and Ltb and the power receiving coil Lr. The configuration described above allows the magnetic core Cca of the first auxiliary coil Lca and the magnetic core Ccb of the second auxiliary coil Lcb to be coupled to the magnetic core Cta of the first power feeding coil Lta and the magnetic core Ctb of the second power feeding coil Ltb, respectively, via the magnetic core Ct2c of the additional coil Lt2c. Thus, the first auxiliary coil Lca easily generates a magnetic flux that enhances the magnetic field between the first power feeding coil Lta and the power receiving coil Lr, and the second auxiliary coil Lcb easily generates a magnetic flux that enhances the magnetic field between the second Power feeding coil Ltb and the power receiving coil Lr. That is, the magnetic flux generated by the first power feeding coil Lta and the magnetic flux generated by the first auxiliary coil Lca are oriented in substantially the same direction between the first power feeding coil Lta and the power receiving coil Lr, and the magnetic flux generated by the second power feeding coil Ltb and the magnetic flux generated by the second auxiliary coil Lcb are oriented in substantially the same direction between the second power feeding coil Ltb and the power receiving coil Lr. Accordingly, the magnetic flux interlinking all of the first and second power feeding coils Lta and Ltb, the additional coil Lt2c, and the power receiving coil Lr, which contributes to power transmission, is not canceled by the magnetic flux generated by the first and second auxiliary coils Lca and Lcb. As a result, a reduction in power transmission efficiency may further be prevented or minimized.

Furthermore, as illustrated in FIG. 5, the axes of the first and second auxiliary coils Lca and Lcb are not aligned with the axis of the additional coil Lt2c. Here, the magnetic flux interlinking the first auxiliary coil Lca and the magnetic flux interlinking the additional coil Lt2c are oriented in opposite directions. Thus, if the magnetic flux generated by the first auxiliary coil Lca interlinks with the additional coil Lt2c, the magnetic flux might cancel a magnetic flux that contributes to power transmission. In this embodiment, since the axis of the first auxiliary coil Lca is not aligned with the axis of the additional coil Lt2c, it is difficult for the magnetic flux generated by the first auxiliary coil Lca to interlink with the additional coil Lt2c. As a result, the magnetic flux interlinking all of the first and second power feeding coils Lta and Ltb, the additional coil Lt2c, and the power receiving coil Lr, which contributes to power transmission, is not canceled by the magnetic flux generated by the first auxiliary coil Lea. Likewise, the magnetic flux interlinking the second auxiliary coil Lcb and the magnetic flux interlinking the additional coil Lt2c are also oriented in opposite directions. Thus, if the magnetic flux generated by the second auxiliary coil Lcb interlinks with the additional coil Lt2c, the magnetic flux might cancel a magnetic flux that contributes to power transmission. In this embodiment, since the axis of the second auxiliary coil Lcb is not aligned with the axis of the additional coil Lt2c, it is difficult for the magnetic flux generated by the second auxiliary coil Lcb to interlink with the additional coil Lt2c. As a result, the magnetic flux interlinking all of the first and second power feeding coils Lta and Ltb, the additional coil Lt2c, and the power receiving coil Lr, which contributes to power transmission, is not canceled by the magnetic flux generated by the second auxiliary coil Lcb. Accordingly, a reduction in power transmission efficiency may further be prevented or minimized.

The relative relationship between the magnetic flux generated by a power feeding coil and the magnetic flux generated by an auxiliary coil and the effect of reducing the unwanted leakage magnetic field in this embodiment will now be described in detail with reference to FIGS. 6A and 6B. FIG. 6A is a diagram schematically illustrating the magnetic flux generated by the first and second power feeding coils Lta and Ltb and the additional coil Lt2c in FIG. 5. FIG. 6B is a diagram schematically illustrating the magnetic flux generated by the first and second power feeding coils Lta and Ltb, the additional coil Lt2c, and the first and second auxiliary coils Lca and Lcb in FIG. 5. In FIG. 6A, magnetic fluxes Bt2a to Bt2d are illustrated as typical magnetic fluxes generated by the first and second power feeding coils Lta and Ltb and the additional coil Lt2c. In FIG. 6B, magnetic fluxes Bt2a to Bt2d are illustrated as typical magnetic fluxes generated by the first and second power feeding coils Lta and Ltb and the additional coil Lt2c, and magnetic fluxes Bc2a to Bc2d are schematically illustrated as typical magnetic fluxes generated by the first and second auxiliary coils Lca and Lcb. Note that the illustrated magnetic fluxes schematically depict only the orientations of the individual magnetic fluxes, and do not depict the magnetic flux densities. In FIG. 6A and FIG. 6B, the magnetic flux in the magnetic cores Cta and Ctb of the first and second power feeding coils Lta and Ltb, the magnetic core Ct2c of the additional coil Lt2c, the magnetic cores Cca and Ccb of the first and second auxiliary coils Lca and Lcb, and the magnetic core Cr of the power receiving coil Lr is not illustrated.

First, the magnetic flux generated by the first and second power feeding coils Lta and Ltb and the additional coil Lt2c will be described with reference to FIG. 6A. As illustrated in FIG. 6A, the first and second power feeding coils Lta and Ltb and the additional coil Lt2c generate the magnetic fluxes Bt2a to Bt2d that interlink the first power feeding coil Lta in the direction from the first power feeding coil Lta to the power receiving coil Lr (i.e., vertically upward in FIG. 6A), that interlink the second power feeding coil Ltb in the direction from the power receiving coil Lr to the second power feeding coil Ltb (i.e., vertically downward in FIG. 6A), and that interlink the additional coil Lt2c in the direction from the center portion of the second power feeding coil Ltb to the center portion of the first power feeding coil Lta (i.e., horizontally leftward in FIG. 6A). That is, the first and second power feeding coils Lta and Ltb and the additional coil Lt2c generate the magnetic fluxes Bt2a to Bt2d that circulate in the same direction. In the illustrated example, the magnetic fluxes Bt2a to Bt2d generated by the first and second power feeding coils Lta and Ltb and the additional coil Lt2c include magnetic fluxes Bt2a and Bt2b that interlink with the power receiving coil Lr and that contribute to power transmission, and magnetic fluxes Bt2c and Bt2d that circulate in a location away from the first and second power feeding coils Lta and Ltb without interlinking with the power receiving coil Lr. The interlinking of the magnetic fluxes Bt2a and Bt2b with the power receiving coil Lr induces an electromotive force in the wire Wr of the power receiving coil Lr. The power generated in the power receiving coil Lr is rectified by the rectifier circuit DB, and is output to the load R. In this embodiment, a magnetic path interlinking the first power feeding coil Lta, the second power feeding coil Ltb, and the additional coil Lt2c is formed by magnetic fields respectively generated by the coils Lta, Ltb, and Lt2c, allowing more efficient generation of the magnetic fluxes Bt2a and Bt2b. As a result, the coupling between the first and second power feeding coils Lta and Ltb, the additional coil Lt2c, and the power receiving coil Lr further increases, and power transmission efficiency also further increases. The magnetic fluxes Bt2a to Bt2*d* generated by the first and second power feeding coils Lta and Ltb and the additional coil Lt2*c* do not interlink with the first and second auxiliary coils Lca and Lcb, and the magnetic fluxes Bt2*a* and Bt2*b*, which contribute to power transmission, are not canceled out using the first and second auxiliary coils Lca and Lcb. Thus, a reduction in power transmission efficiency may be prevented or minimized.

The magnetic flux generated by the first and second auxiliary coils Lca and Lcb will now be described with reference to FIG. 6B. The magnetic fluxes Bt2*a* to Bt2*d* generated by the first and second power feeding coils Lta and Ltb and the additional coil Lt2*c* in FIG. 6B are as illustrated in FIG. 6A. As illustrated in FIG. 6B, the first auxiliary coil Lca generates magnetic fluxes Bc2*a* and Bc2*b* that interlink the first auxiliary coil Lca in the direction from the first auxiliary coil Lca to the center portion of the first power feeding coil Lta (i.e., horizontally rightward in FIG. 6B) and that interlink the first power feeding coil Lta in the direction from the first power feeding coil Lta to the power receiving coil Lr (i.e., vertically upward in FIG. 6B). Specifically, in this embodiment, since the axial direction of the first auxiliary coil Lca is nonparallel to the opposing direction of the first and second power feeding coils Lta and Ltb and the power receiving coil Lr, the magnetic fluxes Bc2*a* and Bc2*b* generated by the first auxiliary coil Lca circulate in a location away from the first auxiliary coil Lca without interlinking with the power receiving coil Lr. In particular, in this embodiment, since the axial direction of the first auxiliary coil Lca is perpendicular to the opposing direction of the first and second power feeding coils Lta and Ltb and the power receiving coil Lr, the magnetic fluxes Bc2*a* and Bc2*b* generated by the first auxiliary coil Lca largely circulate also in a location away from the first auxiliary coil Lca. Furthermore, since the first auxiliary coil Lca is arranged on the opposite to the side of the first and second power feeding coils Lta and Ltb facing the power receiving coil Lr, the magnetic fluxes Bc2*a* and Bc2*b* generated by the first auxiliary coil Lca interlink with the first power feeding coil Lta. In addition, since the axis of the first auxiliary coil Lca is not aligned with the axis of the additional coil Lt2*c*, the magnetic fluxes Bc2*a* and Bc2*b* generated by the first auxiliary coil Lca do not interlink with the additional coil Lt2*c*.

Likewise, as illustrated in FIG. 6B, the second auxiliary coil Lcb generates magnetic fluxes Bc2*c* and Bc2*d* that interlink the second auxiliary coil Lcb in the direction from the center portion of the second power feeding coil Ltb to the second auxiliary coil Lcb (i.e., horizontally rightward in FIG. 6B) and that interlink the second power feeding coil Ltb in the direction from the power receiving coil Lr to the second power feeding coil Ltb (i.e., vertically downward in FIG. 6B). Specifically, in this embodiment, since the axial direction of the second auxiliary coil Lcb is nonparallel to the opposing direction of the first and second power feeding coils Lta and Ltb and the power receiving coil Lr, the magnetic fluxes Bc2*c* and Bc2*d* generated by the second auxiliary coil Lcb circulate in a location away from the second auxiliary coil Lcb without interlinking with the power receiving coil Lr. In particular, in this embodiment, since the axial direction of the second auxiliary coil Lcb is perpendicular to the opposing direction of the first and second power feeding coils Lta and Ltb and the power receiving coil Lr, the magnetic fluxes Bc2*c* and Bc2*d* generated by the second auxiliary coil Lcb largely circulate also in a location away from the second auxiliary coil Lcb. In addition, since the second auxiliary coil Lcb is arranged on the opposite to the side of the first and second power feeding coils Lta and Ltb facing the power receiving coil Lr, the magnetic fluxes Bc2*c* and Bc2*d* generated by the second auxiliary coil Lcb interlink with the second power feeding coil Ltb. In addition, since the axis of the second auxiliary coil Lcb is not aligned with the axis of the additional coil Lt2*c*, the magnetic fluxes Bc2*c* and Bc2*d* generated by the second auxiliary coil Lcb do not interlink with the additional coil Lt2*c*.

Next, the effect of reducing the unwanted leakage magnetic field in this embodiment will be described. As described above, the first and second power feeding coils Lta and Ltb and the additional coil Lt2*c* generate the magnetic fluxes Bt2*c* and Bt2*d* that circulate in a location away from the first and second power feeding coils Lta and Ltb. The magnetic fluxes Bt2*c* and Bt2*d* do not contribute to power transmission because of not interlinking with the power receiving coil Lr, and become magnetic fluxes that form an unwanted leakage magnetic field around the first and second power feeding coils Lta and Ltb, although the magnetic fluxes Bt2*c* and Bt2*d* have a significantly lower magnetic flux density than the magnetic fluxes Bt2*a* and Bt2*b* that circulate in the vicinity of the first and second power feeding coils Lta and Ltb. In this embodiment, the direction of circulation of the magnetic fluxes Bc2*a* and Bc2*b* generated by the first auxiliary coil Lca and the direction of circulation of the magnetic fluxes Bc2*c* and Bc2*d* generated by the second auxiliary coil Lcb are opposite to the direction of circulation of the magnetic fluxes Bt2*a* to Bt2*d* generated by the first and second power feeding coils Lta and Ltb and the additional coil Lt2*c*. Accordingly, as illustrated in FIG. 6B, the magnetic fluxes Bt2*c* and Bt2*d* generated by the first and second power feeding coils Lta and Ltb and the additional coil Lt2*c* and the magnetic fluxes Bc2*a* to Bc2*d* generated by the first and second auxiliary coils Lca and Lcb are oriented in opposite directions in a location away from the first and second power feeding coils Lta and Ltb. That is, the magnetic fluxes Bt2*c* and Bt2*d* generated by the first and second power feeding coils Lta and Ltb and the additional coil Lt2*c* are canceled by the magnetic fluxes Bc2*a* to Bc2*d* generated by the first and second auxiliary coils Lca and Lcb in a location away from the first and second power feeding coils Lta and Ltb. As a result, the unwanted leakage magnetic field may be reduced.

On the other hand, the magnetic fluxes Bt2*a* and Bt2*b* generated by the first and second power feeding coils Lta and Ltb and the magnetic fluxes Bc2*a* and Bc2*b* generated by the first auxiliary coil Lca are oriented in substantially the same direction in the vicinity of the first power feeding coil Lta. That is, the magnetic field generated by the first auxiliary coil Lca enhances a part of the magnetic field between the first power feeding coil Lta and the power receiving coil Lr. In this manner, the magnetic fluxes Bt2*a* and Bt2*b* generated by the first power feeding coil Lta and the magnetic fluxes Bc2*a* and Bc2*b* generated by the first auxiliary coil Lca are oriented in substantially the same direction between the first power feeding coil Lta and the power receiving coil Lr. Accordingly, the magnetic fluxes Bt2*a* and Bt2*b* interlinking both the first power feeding coil Lta and the power receiving coil Lr, which contribute to power transmission, are not canceled by the magnetic fluxes Bc2*a* and Bc2*b* generated by the first auxiliary coil Lca. As a result, a reduction in power transmission efficiency may be prevented or minimized. Similarly, the magnetic fluxes Bt2*a* and Bt2*b* generated by the first and second power feeding coils Lta and Ltb and the magnetic fluxes Bc2*c* and Bc2*d* generated by the second auxiliary coil Lcb are oriented in substantially the same direction in the vicinity of the second power feeding coil Ltb. That is, the magnetic field generated by the second auxiliary coil Lcb enhances a part of the magnetic field between the second power feeding coil Ltb and the power receiving coil Lr. In this manner, the magnetic fluxes Bt2a and Bt2b generated by the second power feeding coil Ltb and the magnetic fluxes Bc2c and Bc2d generated by the second auxiliary coil Lcb are oriented in substantially the same direction between the second power feeding coil Ltb and the power receiving coil Lr. Accordingly, the magnetic fluxes Bt2a and Bt2b interlinking both the second power feeding coil Ltb and the power receiving coil Lr, which contribute to power transmission, are not canceled by the magnetic fluxes Bc2c and Bc2d generated by the second auxiliary coil Lcb. As a result, a reduction in power transmission efficiency may be prevented or minimized.

In this manner, the magnetic fluxes Bc2a to Bc2d generated by the first and second auxiliary coils Lca and Lcb do not cancel the magnetic fluxes Bt2a and Bt2b that is generated by the first and second power feeding coil Lta and Ltb and are interlinking with the power receiving coil Lr, and the magnetic flux Bc2a to Bc2d generated by the first and second auxiliary coil Lca and Lcb cancel the magnetic flux Bt2c and Bt2d that is generated by the first and second power feeding coil Lta and Ltb and is not interlinking with the power receiving coil Lr. This may prevent or minimize a reduction in power transmission efficiency while reducing an unwanted leakage magnetic field formed in a location away from the first and second power feeding coils Lta and Ltb.

In the manner described above, in the power feeding coil unit Ltu2 according to this embodiment, the axial direction of the first and second auxiliary coils Lca and Lcb is nonparallel to the opposing direction of the first and second power feeding coils Lta and Ltb and the power receiving coil Lr. This allows the magnetic fluxes Bc2a to Bc2d generated by the first and second auxiliary coils Lca and Lcb to easily circulate also in a location away from the first and second auxiliary coils Lca and Lcb without interlinking with the power receiving coil Lr. In this state, the direction of circulation of the magnetic fluxes Bc2a to Bc2d generated by the first and second auxiliary coils Lca and Lcb is opposite to the direction of circulation of the magnetic fluxes Bt2a to Bt2d generated by the first and second power feeding coils Lta and Ltb and the additional coil Lt2c. In locations away from the first and second power feeding coils Lta and Ltb, the additional coil Lt2c, and the first and second auxiliary coils Lca and Lcb, which are magnetic flux generators, therefore, the magnetic fluxes Bt2c and Bt2d generated by the first and second power feeding coils Lta and Ltb and the additional coil Lt2c and the magnetic fluxes Bc2a to Bc2d generated by the first and second auxiliary coils Lca and Lcb are oriented in opposite directions, allowing the magnetic fluxes Bt2c and Bt2d generated by the first and second power feeding coils Lta and Ltb and the additional coil Lt2c and the magnetic fluxes Bc2a to Bc2d generated by the first and second auxiliary coils Lca and Lcb to be canceled by each other. The strength of a magnetic field formed in a location away from the first and second power feeding coils Lta and Ltb is reduced. In addition, the first and second auxiliary coils Lca and Lcb are arranged not to interlink with the magnetic fluxes Bt2a and Bt2b interlinking with the power receiving coil Lr arranged to face the first and second power feeding coils Lta and Ltb during power feeding. Thus, the magnetic fluxes Bt2a and Bt2b, which contribute to power transmission, are not canceled out using the first and second auxiliary coils Lca and Lcb. Accordingly, a reduction in power transmission efficiency may be prevented or minimized with a reduction in an unwanted leakage magnetic field formed in a location away from the first and second power feeding coils Lta and Ltb.

The power feeding coil unit Ltu2 according to this embodiment further includes the additional coil Lt2c arranged on the opposite to the side of the first and second power feeding coils Lta and Ltb facing the power receiving coil Lr so that the center portion of the additional coil Lt2c is located between the center portion of the first power feeding coil Lta and the center portion of the second power feeding coil Ltb. In addition, a magnetic path interlinking the first power feeding coil Lta, the second power feeding coil Ltb, and the additional coil Lt2c is generated by a magnetic field of the first power feeding coil Lta, a magnetic field of the second power feeding coil Ltb, and a magnetic field of the additional coil Lt2c. This may further increase the density of the magnetic fluxes Bt2a to Bt2d generated by the first and second power feeding coils Lta and Ltb. Accordingly, the magnetic fluxes Bt2a and Bt2b, which contribute to power transmission, are more efficiently generated, and power transmission efficiency may thus be further increased.

Third Embodiment

Figure 7:
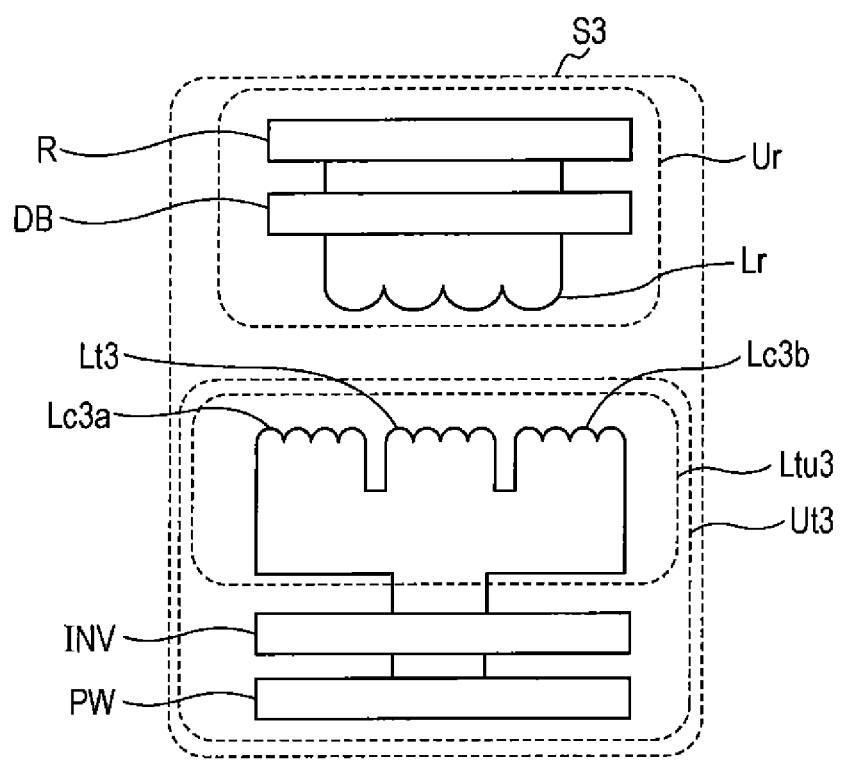
FIG. 7 is a system configuration diagram illustrating a wireless power transmission device according to a third embodiment of the present invention together with a load.

Next, a configuration of a wireless power transmission device S3 according to a third embodiment of the present invention will be described with reference to FIG. 7 and FIG. 8. FIG. 7 is a system configuration diagram illustrating a wireless power transmission device according to the third embodiment of the present invention together with a load. FIG. 8 is a cross-sectional view illustrating a power feeding coil unit according to the third embodiment of the present invention together with a power receiving coil.

As illustrated in FIG. 7, the wireless power transmission device S3 includes a wireless power feeding device Ut3 and a wireless power receiving device Ur.

The wireless power feeding device Ut3 includes a power source PW, an inverter INV, and a power feeding coil unit Ltu3. The configuration of the power source PW and the inverter INV is similar to that in the wireless power transmission device S1 according to the first embodiment. The wireless power transmission device S3 according to this embodiment is different from the wireless power transmission device S1 according to the first embodiment in that the wireless power transmission device S3 includes the power feeding coil unit Ltu3 in place of the power feeding coil unit Ltu1 of the wireless power transmission device S1 according to the first embodiment. The wireless power receiving device Ur is similar to the wireless power receiving device Ur in the wireless power transmission device S1 according to the first embodiment. In the following, a description will be given mainly of the differences from the first embodiment.

As illustrated in FIG. 7, the power feeding coil unit Ltu3 includes a power feeding coil Lt3, a first auxiliary coil Lc3a, and a second auxiliary coil Lc3b. In this embodiment, as illustrated in FIG. 7, three coils, that is, the power feeding coil Lt3 and the first and second auxiliary coils Lc3a and Lc3b, are electrically connected in series with one another.

As illustrated in FIG. 8, the power feeding coil Lt3 includes a magnetic core Ct3 and a wire Wt3. The power feeding coil Lt3 is a solenoid coil wound in a helical shape, and is formed by winding the wire Wt3, which is made of a Litz wire such as a copper wire or an aluminum wire, around the magnetic core Ct3, which is shaped into a plate or a bar. The axial direction of the power feeding coil Lt3 is perpendicular to the opposing direction of the power feeding coil Lt3 and the power receiving coil Lr. The number of turns of the power feeding coil Lt3 is appropriately set on the basis of the separation distance between the power feeding coil Lt3 and the power receiving coil Lr, the desired power transmission efficiency, and so forth.

The first auxiliary coil Lc3a includes a magnetic core Cc3a and a wire Wc3a. The first auxiliary coil Lc3a is a solenoid coil wound in a helical shape, and is formed by winding the wire Wc3a, which is made of a Litz wire such as a copper wire or an aluminum wire, around the magnetic core Cc3a, which is shaped into a plate or a bar. The axial direction of the first auxiliary coil Lc3a is nonparallel to the opposing direction of the power feeding coil Lt3 and the power receiving coil Lr. The configuration described above allows the magnetic flux generated by the first auxiliary coil Lc3a to easily circulate also in a location away from the first auxiliary coil Lc3a without interlinking with the power receiving coil Lr. In this embodiment, the axial direction of the first auxiliary coil Lc3a is perpendicular to the opposing direction of the power feeding coil Lt3 and the power receiving coil Lr, and the axial direction of the first auxiliary coil Lc3a is parallel to the axial direction of the power feeding coil Lt3. In this case, the first auxiliary coil Lc3a more facilitates the generation of a magnetic flux circulating also in a location away from the first auxiliary coil Lc3a.

In addition, the first auxiliary coil Lc3a is arranged not to interlink with a magnetic flux interlinking with the power receiving coil Lr arranged to face the power feeding coil Lt3 during power feeding. That is, the magnetic flux contributing to power transmission is not canceled out using the first auxiliary coil Lc3a. Thus, a reduction in power transmission efficiency may be prevented or minimized. In this embodiment, as illustrated in FIG. 8, the first auxiliary coil Lc3a is arranged on the opposite to the side of the power feeding coil Lt3 facing the power receiving coil Lr. The arrangement described above allows the first auxiliary coil Lc3a to easily generate a magnetic flux that enhances a magnetic field between the power feeding coil Lt3 and the power receiving coil Lr. That is, the magnetic flux generated by the power feeding coil Lt3 and the magnetic flux generated by the first auxiliary coil Lc3a are oriented in substantially the same direction between the power feeding coil Lt3 and the power receiving coil Lr. Accordingly, the magnetic flux interlinking both the power feeding coil Lt3 and the power receiving coil Lr, which contributes to power transmission, is not canceled by the magnetic flux generated by the first auxiliary coil Lc3a. As a result, a reduction in power transmission efficiency may further be prevented or minimized.

Furthermore, the direction of circulation of the magnetic flux generated by the first auxiliary coil Lc3a is opposite to the direction of circulation of the magnetic flux generated by the power feeding coil Lt3. Here, in this embodiment, the axial direction of the first auxiliary coil Lc3a is parallel to the axial direction of the power feeding coil Lt3. Thus, in order to make the direction of circulation of the magnetic flux generated by the first auxiliary coil Lc3a opposite to the direction of circulation of the magnetic flux generated by the power feeding coil Lt3, it may be sufficient that the direction of the magnetic field generated by the first auxiliary coil Lc3a is opposite to the direction of the magnetic field generated by the power feeding coil Lt3. That is, in a case where the first auxiliary coil Lc3a and the power feeding coil Lt3 are wound in the same direction, it may be sufficient to electrically connect the first auxiliary coil Lc3a and the power feeding coil Lt3 to each other so that the direction of the current flowing in the first auxiliary coil Lc3a and the direction of the current flowing in the power feeding coil Lt3 are opposite to each other. Alternatively, in a case where the first auxiliary coil Lc3a and the power feeding coil Lt3 are wound in opposite directions, it may be sufficient to electrically connect the first auxiliary coil Lc3a and the power feeding coil Lt3 to each other so that the direction of the current flowing in the first auxiliary coil Lc3a and the direction of the current flowing in the power feeding coil Lt3 are the same. In addition, the axis of the first auxiliary coil Lc3a is not aligned with the axis of the power feeding coil Lt3. Here, the magnetic flux interlinking the first auxiliary coil Lc3a and the magnetic flux interlinking the power feeding coil Lt3 are oriented in opposite directions. Thus, if the magnetic flux generated by the first auxiliary coil Lc3a interlinks with the power feeding coil Lt3, the magnetic flux might cancel a magnetic flux that contributes to power transmission. In this embodiment, since the axis of the first auxiliary coil Lc3a is not aligned with the axis of the power feeding coil Lt3, it is difficult for the magnetic flux generated by the first auxiliary coil Lc3a to interlink with the power feeding coil Lt3. As a result, the magnetic flux interlinking both the power feeding coil Lt3 and the power receiving coil Lr, which contributes to power transmission, is not canceled by the magnetic flux generated by the first auxiliary coil Lc3a. Accordingly, a reduction in power transmission efficiency may further be prevented or minimized.

The second auxiliary coil Lc3b includes a magnetic core Cc3b and a wire Wc3b. The second auxiliary coil Lc3b is a solenoid coil wound in a helical shape, and is formed by winding the wire Wc3b, which is made of a Litz wire such as a copper wire or an aluminum wire, around the magnetic core Cc3b, which is shaped into a plate or a bar. The axial direction of the second auxiliary coil Lc3b is nonparallel to the opposing direction of the power feeding coil Lt3 and the power receiving coil Lr. The configuration described above allows the magnetic flux generated by the second auxiliary coil Lc3b to easily circulate also in a location away from the second auxiliary coil Lc3b without interlinking with the power receiving coil Lr. In this embodiment, the axial direction of the second auxiliary coil Lc3b is perpendicular to the opposing direction of the power feeding coil Lt3 and the power receiving coil Lr, and the axial direction of the first auxiliary coil Lc3b is parallel to the axial direction of the power feeding coil Lt3. In this case, the second auxiliary coil Lc3b more facilitates the generation of a magnetic flux circulating also in a location away from the second auxiliary coil Lc3b.

In addition, the second auxiliary coil Lc3b is arranged not to interlink with a magnetic flux interlinking with the power receiving coil Lr arranged to face the power feeding coil Lt3 during power feeding. That is, the magnetic flux contributing to power transmission is not canceled out using the second auxiliary coil Lc3b. Thus, a reduction in power transmission efficiency may be prevented or minimized. In this embodiment, as illustrated in FIG. 8, the second auxiliary coil Lc3b is arranged on the opposite to the side of the power feeding coil Lt3 facing the power receiving coil Lr. The arrangement described above allows the second auxiliary coil Lc3b to easily generate a magnetic flux that enhances a magnetic field between the power feeding coil Lt3 and the power receiving coil Lr. That is, the magnetic flux generated by the power feeding coil Lt3 and the magnetic flux generated by the second auxiliary coil Lc3b are oriented in substantially the same direction between the power feeding coil Lt3 and the power receiving coil Lr. Accordingly, the magnetic flux interlinking both the power feeding coil Lt3 and the power receiving coil Lr, which contributes to power transmission, is not canceled by the magnetic flux generated by the second auxiliary coil Lc3b.

As a result, a reduction in power transmission efficiency may further be prevented or minimized.

Furthermore, the direction of circulation of the magnetic flux generated by the second auxiliary coil Lc3b is opposite to the direction of circulation of the magnetic flux generated by the power feeding coil Lt3. Here, in this embodiment, the axial direction of the second auxiliary coil Lc3b is parallel to the axial direction of the power feeding coil Lt3. Thus, in order to make the direction of circulation of the magnetic flux generated by the second auxiliary coil Lc3b opposite to the direction of circulation of the magnetic flux generated by the power feeding coil Lt3, it may be sufficient that the direction of the magnetic field generated by the second auxiliary coil Lc3b is opposite to the direction of the magnetic field generated by the power feeding coil Lt3. That is, in a case where the second auxiliary coil Lc3b and the power feeding coil Lt3 are wound in the same direction, it may be sufficient to electrically connect the second auxiliary coil Lc3b and the power feeding coil Lt3 to each other so that the direction of the current flowing in the second auxiliary coil Lc3b and the direction of the current flowing in the power feeding coil Lt3 are opposite to each other. Alternatively, in a case where the second auxiliary coil Lc3b and the power feeding coil Lt3 are wound in opposite directions, it may be sufficient to electrically connect the second auxiliary coil Lc3b and the power feeding coil Lt3 to each other so that the direction of the current flowing in the second auxiliary coil Lc3b and the direction of the current flowing in the power feeding coil Lt3 are the same. In addition, the axis of the second auxiliary coil Lc3b is not aligned with the axis of the power feeding coil Lt3. Here, the magnetic flux interlinking the second auxiliary coil Lc3b and the magnetic flux interlinking the power feeding coil Lt3 are oriented in opposite directions. Thus, if the magnetic flux generated by the second auxiliary coil Lc3b interlinks with the power feeding coil Lt3, the magnetic fluX might cancel a magnetic flux that contributes to power transmission. In this embodiment, since the axis of the second auxiliary coil Lc3b is not aligned with the axis of the power feeding coil Lt3, it is difficult for the magnetic flux generated by the second auxiliary coil Lc3b to interlink with the power feeding coil Lt3. As a result, the magnetic flux interlinking both the power feeding coil Lt3 and the power receiving coil Lr, which contributes to power transmission, is not canceled by the magnetic flux generated by the second auxiliary coil Lc3b. Accordingly, a reduction in power transmission efficiency may further be prevented or minimized.

In addition, as illustrated in FIG. 8, the magnetic core Ct3 of the power feeding coil Lt3 is connected to each of the magnetic core Cc3a of the first auxiliary coil Lc3a and the magnetic core Cc3b of the second auxiliary coil Lc3b near either end of the surface on a side of the magnetic core Ct3 opposite to the side of the magnetic core Ct3 closer to the power receiving coil Lr (i.e., the lower surface in FIG. 8) in the opposing direction of the power feeding coil Lt3 and the power receiving coil Lr. The configuration described above allows the magnetic core Cc3a of the first auxiliary coil Lc3a and the magnetic core Cc3b of the second auxiliary coil Lc3b to be coupled to the magnetic core Ct3 of the power feeding coil Lt3. Thus, the first auxiliary coil Lc3a easily generates a magnetic flux that enhances a magnetic field between the power feeding coil Lt3 and the power receiving coil Lr, and the second auxiliary coil Lc3b easily generates a magnetic flux that enhances a magnetic field between the power feeding coil Lt3 and the power receiving coil Lr. That is, the magnetic flux generated by the power feeding coil Lt3 and the magnetic flux generated by the first auxiliary coil Lc3a are oriented in substantially the same direction, and the magnetic flux generated by the power feeding coil Lt3 and the magnetic flux generated by the second auxiliary coil Lc3b are oriented in substantially the same direction between the power feeding coil Lt3 and the power receiving coil Lr. Accordingly, the magnetic flux interlinking both the power feeding coil Lt3 and the power receiving coil Lr, which contributes to power transmission, is not canceled by the magnetic flux generated by the first and second auxiliary coils Lc3a and Lc3b. As a result, a reduction in power transmission efficiency may further be prevented or minimized.

Figure 9B:
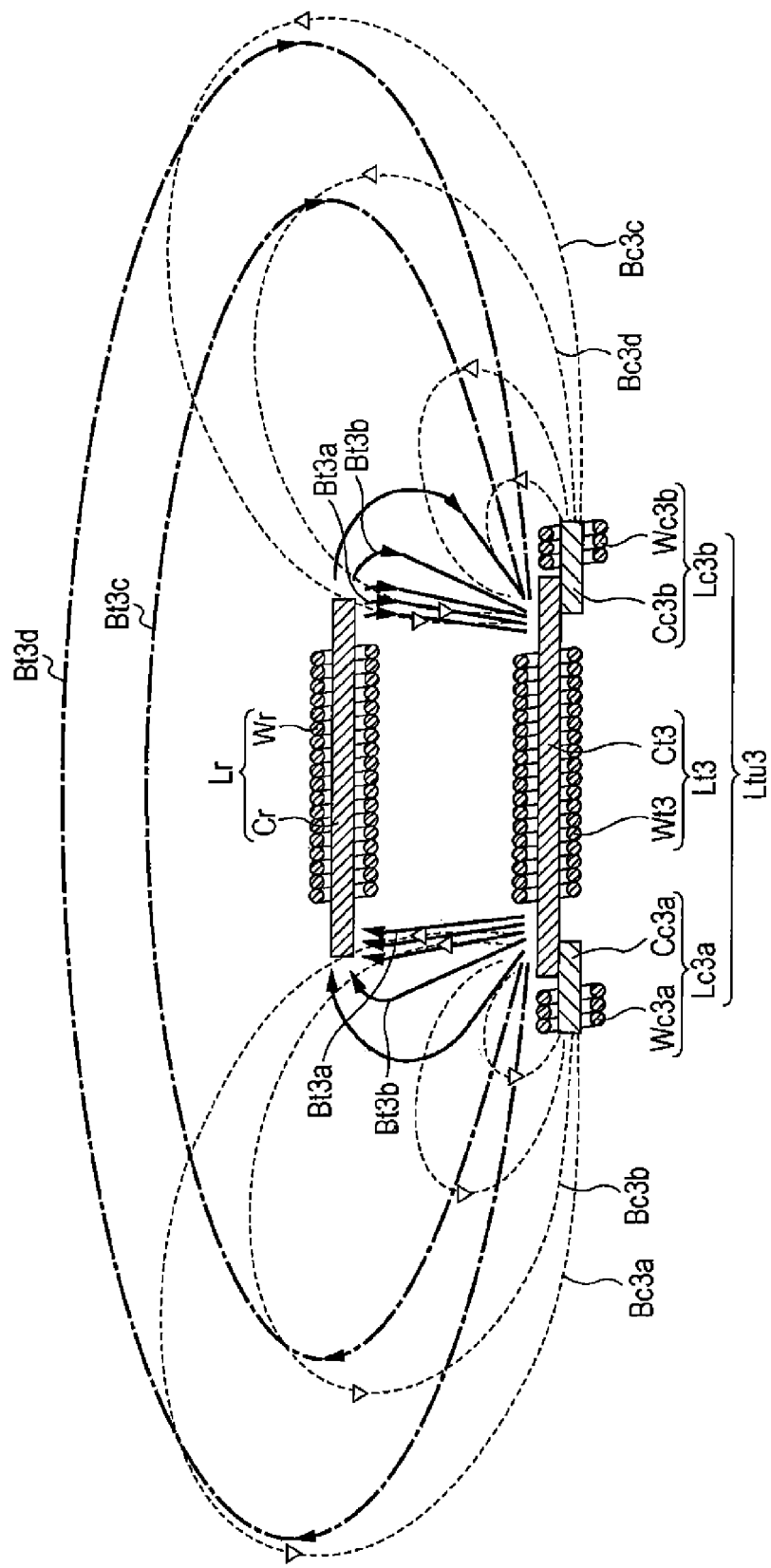
FIG. 9B is a diagram schematically illustrating the magnetic flux generated by the power feeding coil and first and second auxiliary coils in FIG. 8.

The relative relationship between the magnetic flux generated by a power feeding coil and the magnetic flux generated by an auxiliary coil and the effect of reducing the unwanted leakage magnetic field in this embodiment will now be described in detail with reference to FIGS. 9A and 9B. FIG. 9A is a diagram schematically illustrating the magnetic flux generated by the power feeding coil Lt3 in FIG. 8. FIG. 9B is a diagram schematically illustrating the magnetic flux generated by the power feeding coil Lt3 and the first and second auxiliary coils Lc3a and Lc3b. In FIG. 9A, magnetic fluxes Bt3a to Bt3d are illustrated as typical magnetic fluxes generated by the power feeding coil Lt3. In FIG. 9B, magnetic fluxes Bt3a to Bt3d are illustrated as typical magnetic fluxes generated by the power feeding coil Lt3, and magnetic fluxes Bc3a to Bc3d are schematically illustrated as typical magnetic fluxes generated by first and second auxiliary coils Lc3a and Lc3b. Note that the illustrated magnetic fluxes schematically depict only the orientations of the individual magnetic fluxes, and do not depict the magnetic flux densities. In FIG. 9A and FIG. 9B, the magnetic flux in the magnetic core Ct3 of the power feeding coil Lt3, the magnetic cores Cc3a and Cc3b of the first and second auxiliary coils Lc3a and Lc3b, and the magnetic core Cr of the power receiving coil Lr is not illustrated.

First, the magnetic flux generated by the power feeding coil Lt3 will be described with reference to FIG. 9A. As illustrated in FIG. 9A, the power feeding coil Lt3 generates the magnetic fluxes Bt3a to Bt3d that interlink the power feeding coil Lt3 in the direction from the second auxiliary coil Lc3b to the first auxiliary coil Lc3a (i.e., horizontally leftward in FIG. 9A). In the illustrated example, the magnetic fluxes Bt3a to Bt3d generated by the power feeding coil Lt3 include magnetic fluxes Bt3a and Bt3b that interlink with the power receiving coil Lr and that contribute to power transmission, and magnetic fluxes Bt3c and Bt3d that circulate in a location away from the power feeding coil Lt3 without interlinking with the power receiving coil Lr. The interlinking of the magnetic fluxes Bt3a and Bt3b with the power receiving coil Lr induces an electromotive force in the wire Wr of the power receiving coil Lr. The power generated in the power receiving coil Lr is rectified by the rectifier circuit DB, and is output to the load R. The magnetic fluxes Bt3a to Bt3d generated by the power feeding coil Lt3 do not interlink with the first and second auxiliary coils Lc3a and Lc3b, and the magnetic fluxes Bt3a and Bt3b, which contribute to power transmission, are not canceled out using the first and second auxiliary coils Lc3a and Lc3b. Thus, a reduction in power transmission efficiency may be prevented or minimized.

The magnetic flux generated by the first and second auxiliary coils Lc3a and Lc3b will now be described with reference to FIG. 9B. The magnetic fluxes Bt3a to Bt3d generated by the power feeding coil Lt3 in FIG. 9B are as illustrated in FIG. 9A. As illustrated in FIG. 9B, the first auxiliary coil Lc3a generates magnetic fluxes Bc3a and Bc3b that interlink the first auxiliary coil Lc3a in the direction from the first auxiliary coil Lc3a to a center portion of the power feeding coil Lt3 (i.e., horizontally rightward in FIG. 9B) and that do not interlink the power feeding coil Lt3 and circulate in the direction from the power feeding coil Lt3 to the power receiving coil Lr (i.e., vertically upward in FIG. 9B). Specifically, in this embodiment, since the axial direction of the first auxiliary coil Lc3a is nonparallel to the opposing direction of the power feeding coil Lt3 and the power receiving coil Lr, the magnetic fluxes Bc3a and Bc3b generated by the first auxiliary coil Lc3a circulate in a location away from the first auxiliary coil Lc3a without interlinking with the power receiving coil Lr. In particular, in this embodiment, since the axial direction of the first auxiliary coil Lc3a is perpendicular to the opposing direction of the power feeding coil Lt3 and the power receiving coil Lr, the magnetic fluxes Bc3a and Bc3b generated by the first auxiliary coil Lc3a largely circulate also in a location away from the first auxiliary coil Lc3a. In addition, since the axis of the first auxiliary coil Lc3a is not aligned with the axis of the power feeding coil Lt3, the magnetic fluxes Bc3a and Bc3b generated by the first auxiliary coil Lc3a do not interlink with the power feeding coil Lt3.

Likewise, as illustrated in FIG. 9B, the second auxiliary coil Lc3b generates magnetic fluxes Bc3c and Bc3d that interlink the second auxiliary coil Lc3b in the direction from the center portion of the power feeding coil Lt3 to the second auxiliary coil Lc3b (i.e., horizontally rightward in FIG. 9B) and that do not interlink with the power feeding coil Lt3 and circulate in the direction from the power receiving coil Lr to the power feeding coil Lt3 (i.e., vertically downward in FIG. 9B). Specifically, in this embodiment, since the axial direction of the second auxiliary coil Lc3b is nonparallel to the opposing direction of the power feeding coil Lt3 and the power receiving coil Lr, the magnetic fluxes Bc3c and Bc3d generated by the second auxiliary coil Lc3b circulate in a location away from the second auxiliary coil Lc3b without interlinking with the power receiving coil Lr. In particular, in this embodiment, since the axial direction of the second auxiliary coil Lc3b is perpendicular to the opposing direction of the power feeding coil Lt3 and the power receiving coil Lr, the magnetic fluxes Bc3c and Bc3d generated by the second auxiliary coil Lc3b largely circulate also in a location away from the second auxiliary coil Lc3b. In addition, since the axis of the second auxiliary coil Lc3b is not aligned with the axis of the power feeding coil Lt3, the magnetic fluxes Bc3c and Bc3d generated by the second auxiliary coil Lc3b do not interlink with the power feeding coil Lt3.

Next, the effect of reducing the unwanted leakage magnetic field in this embodiment will be described. As described above, the power feeding coil Lt3 generates the magnetic fluxes Bt3c and Bt3d that circulate in a location away from the power feeding coil Lt3. The magnetic fluxes Bt3c and Bt3d do not contribute to power transmission, and become magnetic fluxes that form an unwanted leakage magnetic field around the power feeding coil Lt3. In this embodiment, the direction of circulation of the magnetic fluxes Bc3a and Bc3b generated by the first auxiliary coil Lc3a and the direction of circulation of the magnetic fluxes Bc3c and Bc3d generated by the second auxiliary coil Lc3b are opposite to the direction of circulation of the magnetic fluxes Bt3a to Bt3d generated by the power feeding coil Lt3. Accordingly, as illustrated in FIG. 9B, the magnetic fluxes Bt3c and Bt3d generated by the power feeding coil Lt3 and the magnetic fluxes Bc3a to Bc3d generated by the first and second auxiliary coils Lc3a and Lc3b are oriented in opposite directions in a location away from the power feeding coil Lt3. That is, the magnetic fluxes Bt3c and Bt3d generated by the power feeding coil Lt3 are canceled by the magnetic fluxes Bc3a to Bc3d generated by the first and second auxiliary coils Lc3a and Lc3b in a location away from the power feeding coil Lt3. As a result, the unwanted leakage magnetic field may be reduced.

On the other hand, the magnetic fluxes Bt3a and Bt3b generated by the power feeding coil Lt3 and the magnetic fluxes Bc3a and Bc3b generated by the first auxiliary coil Lc3a are oriented in substantially the same direction in the vicinity of the power feeding coil Lt3. That is, the magnetic field generated by the first auxiliary coil Lc3a enhances a part of the magnetic field between the power feeding coil Lt3 and the power receiving coil Lr. In this manner, the magnetic fluxes Bt3a and Bt3b generated by the power feeding coil Lt3 and the magnetic fluxes Bc3a and Bc3b generated by the first auxiliary coil Lc3a are oriented in substantially the same direction between the power feeding coil Lt3 and the power receiving coil Lr. Accordingly, the magnetic fluxes Bt3a and Bt3b interlinking both the power feeding coil Lt3 and the power receiving coil Lr, which contribute to power transmission, are not canceled by the magnetic fluxes Bc3a and Bc3b generated by the first auxiliary coil Lc3a. As a result, a reduction in power transmission efficiency may be prevented or minimized. Similarly, the magnetic fluxes Bt3a and Bt3b generated by the power feeding coil Lt3 and the magnetic fluxes Bc3c and Bc3d generated by the second auxiliary coil Lc3b are oriented in substantially the same direction in the vicinity of the power feeding coil Lt3. That is, the magnetic field generated by the second auxiliary coil Lc3b enhances a part of the magnetic field between the power feeding coil Lt3 and the power receiving coil Lr. In this manner, the magnetic fluxes Bt3a and Bt3b generated by the power feeding coil Lt3 and the magnetic fluxes Bc3c and Bc3d generated by the second auxiliary coil Lc3b are oriented in substantially the same direction between the power feeding coil Lt3 and the power receiving coil Lr. Accordingly, the magnetic fluxes Bt3a and Bt3b interlinking both the power feeding coil Lt3 and the power receiving coil Lr, which contribute to power transmission, are not canceled by the magnetic fluxes Bc3c and Bc3d generated by the second auxiliary coil Lc3b. As a result, a reduction in power transmission efficiency may be prevented or minimized.

In this manner, the magnetic fluxes Bc3a to Bc3d generated by the first and second auxiliary coils Lc3a and Lc3b do not cancel the magnetic fluxes Bt3a and Bt3b that is generated by the power feeding coil Lt3 and are interlinking with the power receiving coil Lr, and the magnetic flux Bc3a to Bc3d generated by the first and second auxiliary coil Lc3a and Lc3b cancel the magnetic flux Bt3c and Bt3d that is generated by the power feeding coil Lt3 and is not interlinking with the power receiving coil Lr. This may prevent or minimize a reduction in power transmission efficiency while reducing an unwanted leakage magnetic field formed in a location away from the power feeding coil Lt3.

In the manner described above, in the power feeding coil unit Ltu3 according to this embodiment, the axial direction of the first and second auxiliary coils Lc3a and Lc3b is nonparallel to the opposing direction of the power feeding coil Lt3 and the power receiving coil Lr. This allows the magnetic fluxes Bc3a to Bc3d generated by the first and second auxiliary coils Lc3a and Lc3b to easily circulate also in a location away from the first and second auxiliary coils Lc3a and Lc3b without interlinking with the power receiving coil Lr. In this state, the direction of circulation of the magnetic fluxes Bc3a to Bc3d generated by the first and second auxiliary coils Lc3a and Lc3b is opposite to the direction of circulation of the magnetic fluxes Bt3a to Bt3d generated by the power feeding coil Lt3. In locations away from the power feeding coil Lt3 and the first and second auxiliary coils Lc3a and Lc3b, which are magnetic flux generators, the magnetic fluxes Bt3c and Bt3d generated by the power feeding coil Lt3 and the magnetic fluxes Bc3a to Bc3d generated by the first and second auxiliary coils Lc3a and Lc3b are oriented in opposite directions, allowing the magnetic fluxes Bt3c and Bt3d generated by the power feeding coil Lt3 and the magnetic fluxes Bc3a to Bc3d generated by the first and second auxiliary coils Lc3a and Lc3b to be canceled by each other. The strength of a magnetic field formed in a location away from the power feeding coil Lt3 is reduced. In addition, the first and second auxiliary coils Lc3a and Lc3b are arranged not to interlink with the magnetic fluxes Bt3a and Bt3b interlinking with the power receiving coil Lr arranged to face the power feeding coil Lt3 during power feeding. Thus, the magnetic fluxes Bt3a and Bt3b, which contribute to power transmission, are not canceled out using the first and second auxiliary coils Lc3a and Lc3b. Accordingly, a reduction in power transmission efficiency may be prevented or minimized with a reduction in an unwanted leakage magnetic field formed in a location away from the power feeding coil Lt3.

Hereinafter, advantages achievable with the exemplary embodiments disclosed herein, which prevent or minimize a reduction in power transmission efficiency while reducing an unwanted leakage magnetic field formed in a location away from a power feeding coil, will be specifically described with reference to Examples 1 and 2 and Comparative Examples 1 to 4.

In Example 1, the wireless power transmission device S1 according to the first embodiment described above was used. In Example 2, the wireless power transmission device S3 according to the third embodiment described above was used. In Comparative Example 1, for comparison with Example 1 in terms of characteristics, a wireless power transmission device configured such that the wireless power transmission device S1 according to the first embodiment does not include an auxiliary coil was used. In Comparative Example 2, for comparison with Example 1 in terms of characteristics, a wireless power transmission device configured such that noise canceling coils Ln20a and Ln20b that interlink with a magnetic flux created by a power feeding coil are added to Comparative Example 1 was used. In Comparative Example 3, for comparison with Example 2 in terms of characteristics, a wireless power transmission device configured such that the wireless power transmission device S3 according to the third embodiment does not include an auxiliary coil was used. In Comparative Example 4, for comparison with Example 2 in terms of characteristics, a wireless power transmission device configured such that a noise canceling coil Ln40 that interlinks with a magnetic flux created by a power feeding coil is added to Comparative Example 3 was used.

Figure 10:
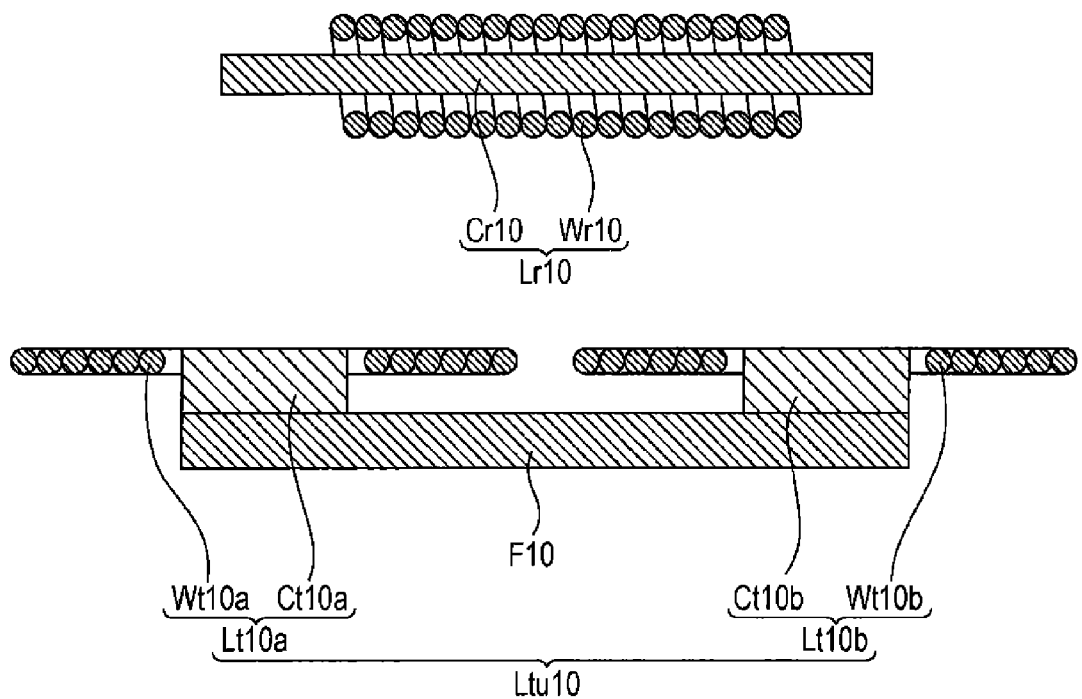
FIG. 10 is a cross-sectional view illustrating a power feeding coil unit in Comparative Example 1 together with a power receiving coil.

First, the configuration of a power feeding coil unit Ltu10 and a power receiving coil. Lr10 in the wireless power transmission device in Comparative Example 1 will be described with reference to FIG. 10. FIG. 10 is a cross-sectional view illustrating the power feeding coil unit in Comparative Example 1 together with a power receiving coil. The power feeding coil unit Ltu10 includes a magnetic body F10 and first and second power feeding coils Lt10a and Lt10b. Each of the first and second power feeding coils Lt10a and Lt10b is a planar-shaped spiral coil having a substantially rectangular shape. The first power feeding coil Lt10a is formed by winding a wire Wt10a around a first magnetic core Ct10a, and the second power feeding coil Lt10b is formed by winding a wire Wt10b around a second magnetic core Ct10b. The magnetic cores Ct10a and Ct10b are connected to each other through the magnetic body F10. That is, the power feeding coil unit Ltu10 in Comparative Example 1 is equivalent to a configuration in which the first auxiliary coil Lca and the second auxiliary coil Lcb are excluded from the power feeding coil unit Ltu1 of the wireless power transmission device S1 in Example 1. The power receiving coil Lr10 is a solenoid coil wound in a helical shape, and is formed by winding a wire Wr10 around a magnetic core Cr10 shaped into a plate or a bar. The power receiving coil Lr10 in Comparative Example 1 is similar to the power receiving coil Lr in the wireless power transmission device S1 in Example 1.

Figure 11:
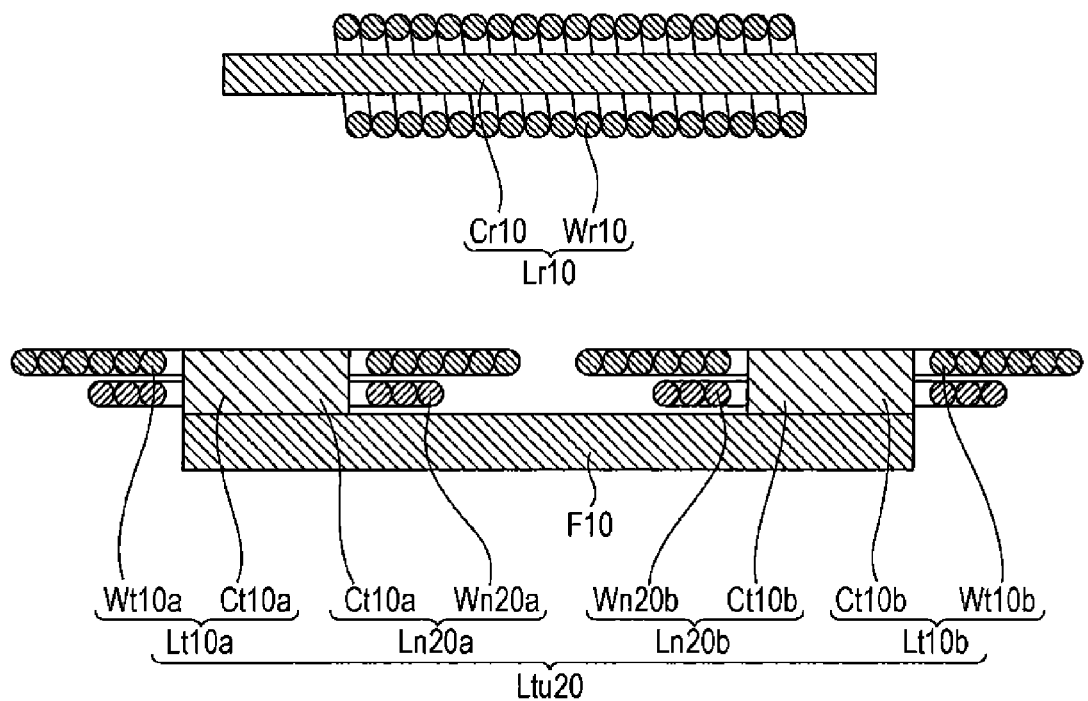
FIG. 11 is a cross-sectional view illustrating a power feeding coil unit in Comparative Example 2 together with a power receiving coil.

Next, the configuration of a power feeding coil unit Ltu20 and a power receiving coil Lr10 in the wireless power transmission device in Comparative Example 2 will be described with reference to FIG. 11. FIG. 11 is a cross-sectional view illustrating the power feeding coil unit in Comparative Example 2 together with a power receiving coil. The power feeding coil unit Ltu20 includes a magnetic body F10, first and second power feeding coils Lt10a and Lt10b, and first and second noise canceling coils Ln20a and Ln20b. The power feeding coil unit Ltu20 in Comparative Example 2 is equivalent to a configuration in which the first and second noise canceling coils Ln20a and Ln20b are added to the power feeding coil unit Ltu10 in Comparative Example 1. Each of the first and second noise canceling coils Ln20a and Ln20b is a planar-shaped spiral coil having a substantially rectangular shape. As illustrated in FIG. 11, the power feeding coil unit Ltu20 is configured such that a wire Wn20a of the first noise canceling coil Ln20a is wound around the magnetic core Ct10a between the first power feeding coil Lt10a and the magnetic body F10, and a wire Wn20b of the second noise canceling coil Ln20b is wound around the magnetic core Ct10b between the second power feeding coil Lt10b and the magnetic body F10. The configuration described above allows the first and second noise canceling coils Ln20a and Ln20b to interlink with a magnetic flux created by the first and second power feeding coils Lt10a and Lt10b. Here, the first and second noise canceling coils Ln20a and Ln20b are wound in a direction opposite to the direction in which the first and second power feeding coils Lt10a and Lt10b are wound. In addition, the power receiving coil Lr10 is a solenoid coil wound in a helical shape, and is formed by winding the wire Wr10 around the magnetic core Cr10, which is shaped into a plate or a bar. The power receiving coil Lr10 in Comparative Example 2 is similar to the power receiving coil Lr in Example 1.

Next, the configuration of a power feeding coil unit Ltu30 and a power receiving coil Lr10 in the wireless power transmission device in Comparative Example 3 will be described with reference to FIG. 12. FIG. 12 is a cross-sectional view illustrating the power feeding coil unit in Comparative Example 2 together with a power receiving coil. The power feeding coil unit Ltu30 in Comparative Example 3 includes a power feeding coil Lt30. The power feeding coil Lt30 is a solenoid coil wound in a helical shape, and is formed by, as illustrated in FIG. 12, winding a wire Wt30 around a magnetic core Ct30. The power feeding coil unit Ltu30 in Comparative Example 3 is equivalent to a configuration in which the first auxiliary coil Lc3a and the second auxiliary coil Lc3b are excluded from the power feeding coil unit Ltu3 of the wireless power transmission device S3 in Example 2. The power receiving coil Lr10 is a solenoid coil wound in a helical shape, and is formed by winding the wire Wr10 around the magnetic core Cr10, which is shaped into a plate or a bar. The power receiving coil Lr10 in Comparative Example 3 is similar to the power receiving coil Lr in Example 2.

Figure 13:
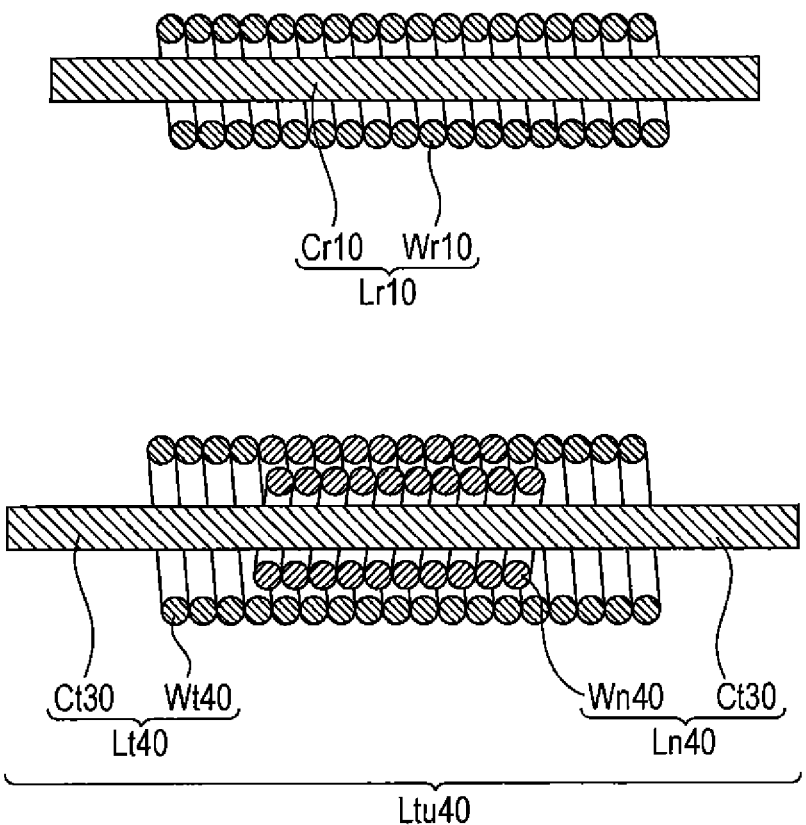
FIG. 13 is a cross-sectional view illustrating a power feeding coil unit in Comparative Example 4 together with a power receiving coil.

Next, the configuration of a power feeding coil unit Ltu40 and a power receiving coil Lr10 in the wireless power transmission device in Comparative Example 4 will be described with reference to FIG. 13. FIG. 13 is a cross-sectional view illustrating the power feeding coil unit in Comparative Example 2 together with a power receiving coil. The power feeding coil unit Ltu40 includes a power feeding coil Lt40 and a noise canceling coil Ln40. The power feeding coil unit Ltu40 in Comparative Example 4 is equivalent to a configuration in which the noise canceling coil Ln40 is added to the power feeding coil unit Ltu30 in Comparative Example 3. The noise canceling coil Ln40 is a solenoid coil wound in a helical shape, and is configured such that, as illustrated in FIG. 13, a wire Wn40 of the noise canceling coil Ln40 is wound around the magnetic core Ct30 and a wire Wt40 of the power feeding coil Lt40 is further wound on the outer surface of the noise canceling coil Ln40. The configuration described above allows the noise canceling coil Ln40 to interlink with a magnetic flux created by the power feeding coil Lt40. Here, the noise canceling coil Ln40 is wound in a direction opposite to the direction in which the power feeding coil Lt40 is wound. The power receiving coil Lr10 is a solenoid coil wound in a helical shape, and is formed by winding the wire Wr10 around the magnetic core Cr10, which is shaped into a plate or a bar. The power receiving coil Lr10 in Comparative Example 4 is similar to the power receiving coil Lr in Example 2.

Here, in Examples 1 and 2 and Comparative Examples 1 to 4, a Litz wire with a diameter of approximately 6 mm which is formed by twisting approximately 4000 polyimide-coated copper wires each having a diameter of 0.05 mm was used for each of the wires Wta, Wtb, Wt10a, and Wt10b of the first and second power feeding coils Lta, Ltb, Lt10a, and Lt10b, the wires Wt3, Wt30, and Wt40 of the power feeding coils Lt3a, Lt30, and Lt40, the wires Wca, Wcb, Wc3a, and Wc3b of the first and second auxiliary coils Lca, Lcb, Lc3a, and Lc3b, the wires Wn20a and Wn20b of the first and second noise canceling coils Ln20a and Ln20b, the wire Wn40 of the noise canceling coil Ln40, and the wires Wr and Wr10 of the power receiving coils Lr and Lr10. In addition, ferrite cores of the same material (with a relative magnetic permeability of approximately 3000) were used for the magnetic cores Cta, Ctb, Ctl0a, and Ct10b of the first and second power feeding coils Lta, Ltb, Lt10a, and Lt10b, the magnetic cores Ct3 and Ct30 of the power feeding coils Lt3, Lt30, and Lt40, the magnetic cores Cca, Ccb, Cc3a, and Cc3b of the first and second auxiliary coils Lca, Lcb, Lc3a, and Lc3b, the magnetic bodies F1 and F10, and the magnetic cores Cr and Cr10 of the power receiving coils Lr and Lr10.

Furthermore, in the power feeding coil unit Ltu1 in Example 1, the magnetic body F1 having a length of 300 mm, a width of 300 mm, and a thickness of 15 mm, the magnetic cores Cta and Ctb of the first and second power feeding coils Lta and Ltb each having a length of 100 mm, a width of 300 mm, and a thickness of 24 mm, the magnetic cores Cca and Ccb of the first and second auxiliary coils Lca and Lcb each having a length of 40 mm, a width of 300 mm, and a thickness of 15 mm, and the magnetic core Cr of the power receiving coil Lr having a length of 300 mm, a width of 300 mm, and a thickness of 10 mm were used. In the power feeding coil unit Ltu10 in Comparative Example 1 and the power feeding coil unit Ltu20 in Comparative Example 2, the magnetic body F10 having a length of 300 mm, a width of 300 mm, and a thickness of 15 mm, the magnetic cores Ct10a and Ct10b of the first and second power feeding coils Lt10a and Lt10b each having a length of 100 mm, a width of 300 mm, and a thickness of 24 mm, and the magnetic core Cr10 of the power receiving coil Lr10 having a length of 300 mm, a width of 300 mm, and a thickness of 10 mm were used.

Moreover, the number of turns of each coil in Example 1 and Comparative Examples 1 and 2 was set in accordance with Table 1 below.

TABLE 1

| | Number of turns | | |
|---|---|---|---|
| | Example 1 | Comparative Example 1 | Comparative Example 1 |
| First and second power feeding coils | 10 turns × 2 | 10 turns × 2 | 10 turns × 2 |
| First and second auxiliary coils | 5 turns × 2 | No coil | No coil |
| First and second noise canceling coils | No coil | No coil | 5 turns × 2 |
| Power receiving coil | 10 turns | 10 turns | 10 turns |

In the power feeding coil unit Ltu3 in Example 2, the magnetic core Ct3 of the power feeding coil Lt3 having a length of 300 mm, a width of 300 mm, and a thickness of 15 mm, the magnetic cores Cc3a and Cc3b of the first and second auxiliary coils Lc3a and Lc3b each having a length of 60 mm, a width of 300 mm, and a thickness of 15 mm, and the magnetic core Cr of the power receiving coil Lr having a length of 300 mm, a width of 300 mm, and a thickness of 10 mm were used. In the power feeding coil unit Ltu30 in Comparative Example 3 and the power feeding coil unit Ltu40 in Comparative Example 4, the magnetic core Ct30 of the power feeding coils Lt30 and Lt40 having a length of 300 mm, a width of 300 mm, and a thickness of 15 mm, and the magnetic core Cr10 of the power receiving coil Lr10 having a length of 300 mm, a width of 300 mm, a thickness of 10 mm were used.

In addition, the number of turns of each coil in Example 2 and Comparative Examples 3 and 4 was set in accordance with Table 2 below.

TABLE 2

| | Number of turns | | |
|---|---|---|---|
| | Example 2 | Comparative Example 3 | Comparative Example 4 |
| Power feeding coil | 20 turns | 20 turns | 20 turns |
| First and second auxiliary coils | 10 turns × 2 | No coil | No coil |
| Noise canceling coil | No coil | No coil | 20 turns |
| Power receiving coil | 10 turns | 10 turns | 10 turns |

In each of Examples 1 and 2 and Comparative Examples 1 to 4, the distance between the power feeding coil unit and the power receiving coil was set to 150 mm.

Then, in Examples 1 and 2 and Comparative Examples 1 to 4, the power transmission efficiency and the unwanted leakage magnetic field were measured. This measurement was conducted with no displacement of the power receiving coil, that is, with the distance between the power feeding coil unit and the power receiving coil being kept at 150 mm while the distance between the center of the power receiving coil and the center of the power feeding coil unit was also 150 mm. The supply power of the power source PW was adjusted so that the power to be supplied to the load R became equal to 3 kW.

The power transmission efficiency was measured as follows: The efficiency between the power feeding coil unit and the power receiving coil was calculated by measuring the power supplied from the power source PW and the power supplied to the load R while taking into account the loss at the inverter INV and the loss at the rectifier circuit DB, which were measured in advance.

The unwanted leakage magnetic field was determined using, as an index, the magnetic field strength at a position 10 m away from the center of the power feeding coil unit. A loop antenna was placed at a position 10 m away from the center of the power feeding coil unit in the axial direction of the power receiving coil to measure a magnetic field strength. Here, the loop antenna was used to measure the magnetic field strengths in three orthogonal directions (x, Y, and Z directions), and the magnetic field strengths were combined to calculate a leakage magnetic field strength. Note that the power feeding coil unit was placed at a height of 500 mm from the floor surface with a power transmitting surface thereof facing upward, and the power receiving coil was placed above the power feeding coil unit with an interval of 150 mm between them. In addition, the loop antenna was placed in such a manner that the center of the loop antenna was positioned at a height of 1.5 m from the floor of a radio-frequency (RF) anechoic chamber.

Figure 14:
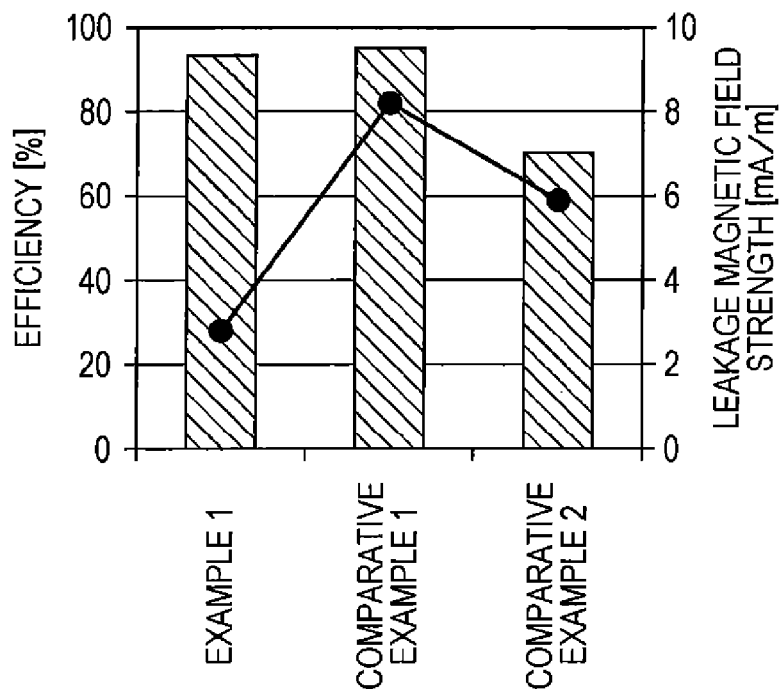
FIG. 14 depicts the results of measurement of the power transmission efficiency and the leakage magnetic field strength in Example 1 according to the present invention and Comparative Examples 1 and 2.
Figure 15:
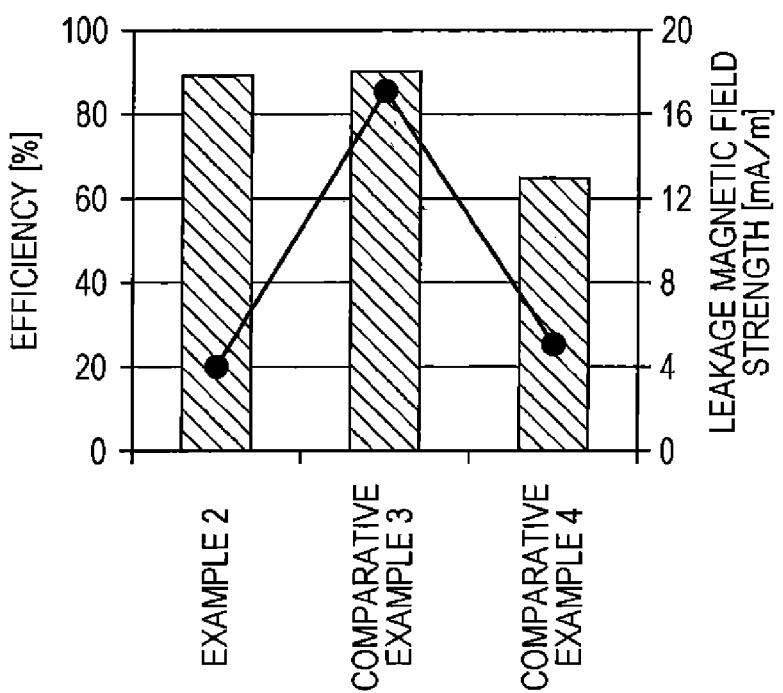
FIG. 15 depicts the results of measurement of the power transmission efficiency and the leakage magnetic field strength in Example 2 according to the present invention and Comparative Examples 3 and 4.

The results of measurement are illustrated in FIGS. 14 and 15. FIG. 14 depicts the results of the measurement in Example 1 and Comparative Examples 1 and 2, and FIG. 15 depicts the results of the measurement in Example 2 and Comparative Examples 3 and 4. In FIGS. 14 and 15, bar graphs depict power transmission efficiency, and line graphs depict leakage magnetic field strength.

First, the results of the measurement in Example 1 and Comparative Examples 1 and 2 will be examined. As illustrated in FIG. 14, compared to Comparative Example 1, Example 1 exhibits substantially equal power transmission efficiency and lower leakage magnetic field strength. In addition, Example 1 exhibits higher power transmission efficiency and lower leakage magnetic field strength than Comparative Example 2. That is, the auxiliary coil in Example 1 (i.e., the first and second auxiliary coils Lca and Lcb) does not cancel out a magnetic flux contributing to power transmission, and thus a reduction in power transmission efficiency is prevented, compared to Comparative Example 1 in which no auxiliary coil is provided. Specifically, it is contemplated that Joule heating generated by a small parasitic resistance of the auxiliary coil will have caused a slight increase in loss. In Example 1, furthermore, the auxiliary coil cancels out a magnetic flux that formed the unwanted leakage magnetic field, and thus the leakage magnetic field strength is significantly reduced, compared to Comparative Example 1 in which no auxiliary coil is provided. In Comparative Example 2, in contrast, it is contemplated that both the power transmission efficiency and the leakage magnetic field strength will have been reduced by the noise canceling coil (i.e., the first and second noise canceling coils Ln20a and Ln20b) canceling out both a magnetic flux that contributes to power transmission and a magnetic flux that forms the unwanted leakage magnetic field. In the manner described above, it has been found that the power feeding coil unit Ltu1 in Example 1 is capable of preventing or minimizing a reduction in power transmission efficiency while reducing the unwanted leakage magnetic field.

The results of the measurement in Example 2 and Comparative Examples 3 and 4 will now be examined. As illustrated in FIG. 15, compared to Comparative Example 3, Example 2 exhibits substantially equal power transmission efficiency and lower leakage magnetic field strength. In addition, compared to Comparative Example 4, Example 2 exhibits higher power transmission efficiency and substantially equal leakage magnetic field strength. The auxiliary coil in Example 2 (i.e., the first and second auxiliary coils Lc3a and Lc3b) does not cancel out a magnetic flux contributing to power transmission, and thus a reduction in power transmission efficiency is prevented, compared to Comparative Example 3 in which no auxiliary coil is provided. Specifically, it is contemplated that Joule heating generated by a small parasitic resistance of the auxiliary coil will have caused a slight increase in loss. In Example 2, furthermore, the auxiliary coil cancels out a magnetic flux that forms the unwanted leakage magnetic field, and thus the leakage magnetic field strength is significantly reduced, compared to Comparative Example 3 in which no auxiliary coil is provided. In Comparative Example 4, in contrast, it is contemplated that both the power transmission efficiency and the leakage magnetic field strength will have been reduced by the noise canceling coil (the noise canceling coil Ln40) canceling out both a magnetic flux that contributes to power transmission and a magnetic flux that forms the unwanted leakage magnetic field. In the manner described above, it has been found that the power feeding coil unit Ltu3 in Example 2 is capable of preventing or minimizing a reduction in power transmission efficiency while reducing the unwanted leakage magnetic field. Accordingly, the effectiveness of the embodiments disclosed herein has been demonstrated.

The present invention has been described with reference to some embodiments thereof. Such embodiments are illustrative, and it is to be understood by a person skilled in the art that various modifications and changes can be made within the scope of the present invention and that such modifications and changes also fall within the scope of the present invention. Accordingly, the description given herein and the drawings taken in conjunction therewith are to be illustrative but not restrictive.

What is claimed is:

1. A power feeding coil unit for wireles sly feeding power, comprising:
   a power feeding coil; and
   an auxiliary coil, wherein
   the auxiliary coil is arranged not to interlink with a magnetic flux that interlinks with a power receiving coil that is arranged to face the power feeding coil during power feeding,
   an axial direction of the auxiliary coil is nonparallel to an opposing direction of the power feeding coil and the power receiving coil,
   a direction of circulation of a magnetic flux generated by the auxiliary coil is opposite to a direction of circulation of a magnetic flux generated by the power feeding coil,
   the power feeding coil comprises a first power feeding coil and a second power feeding coil that are apposed, and
   a magnetic path interlinking the first power feeding coil and the second power feeding coil is generated by a magnetic field of the first power feeding coil and a magnetic field of the second power feeding coil.

2. The power feeding coil unit according to claim 1, wherein the magnetic flux generated by the auxiliary coil does not cancel a magnetic flux that is generated by the power feeding coil and is interlinking with the power receiving coil, and the magnetic flux generated by the auxiliary coil cancels some amount of magnetic flux that is generated by the power feeding coil and is not interlinking with the power receiving coil.

3. The power feeding coil unit according to claim 1, wherein a magnetic field generated by the auxiliary coil enhances a part of a magnetic field between the power feeding coil and the power receiving coil.

4. The power feeding coil unit according to claim 1, wherein each of the power feeding coil and the auxiliary coil includes a magnetic core, and the magnetic core of the auxiliary coil is coupled to the magnetic core of the power feeding coil.

5. The power feeding coil unit according to claim 1, wherein the auxiliary coil is located on the opposite to a side of the power feeding coil facing the power receiving coil.

6. The power feeding coil unit according to claim 5, wherein the auxiliary coil is arranged so that part or all of the auxiliary coil overlaps the power feeding coil when viewed from the opposing direction of the power feeding coil and the power receiving coil.

7. The power feeding coil unit according to claim 1, wherein an axis of the auxiliary coil is substantially perpendicular to the opposing direction of the power feeding coil and the power receiving coil.

8. The power feeding coil unit according to claim 1, wherein at least part of the magnetic flux generated by the auxiliary coil interlinks with the power feeding coil.

9. The power feeding coil unit according to claim 1, wherein the auxiliary coil comprises a first auxiliary coil and a second auxiliary coil, and the first auxiliary coil and the second auxiliary coil are arranged so that a center portion of the power feeding coil is located between a center portion of the first auxiliary coil and a center portion of the second auxiliary coil.

\* \* \* \* \*